US012572259B2

(12) United States Patent
Jiang et al.

(10) Patent No.: US 12,572,259 B2
(45) Date of Patent: Mar. 10, 2026

(54) EMOTIVE IMAGE SHARING

(71) Applicant: Tencent Technology (Shenzhen) Company Limited, Shenzhen (CN)

(72) Inventors: Ruijie Jiang, Shenzhen (CN); Guilin Xiang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 199 days.

(21) Appl. No.: 18/434,765

(22) Filed: Feb. 6, 2024

(65) Prior Publication Data

US 2024/0248581 A1     Jul. 25, 2024

Related U.S. Application Data

(63) Continuation of application No. PCT/CN2023/088287, filed on Apr. 14, 2023.

(30) Foreign Application Priority Data

Oct. 28, 2022   (CN) .......................... 202211332307.2

(51) Int. Cl.
*G06F 3/0482* (2013.01)
*H04M 1/72439* (2021.01)

(52) U.S. Cl.
CPC ...... *G06F 3/0482* (2013.01); *H04M 1/72439* (2021.01)

(58) Field of Classification Search
CPC ................................................ G06F 3/048–05
See application file for complete search history.

(56) References Cited

U.S. PATENT DOCUMENTS

| | | | |
|---|---|---|---|
| 8,171,084 B2 * | 5/2012 | Walter | H04L 51/04 |
| | | | 709/204 |
| 2018/0295072 A1 * | 10/2018 | Yim | H04L 51/10 |
| 2018/0373683 A1 * | 12/2018 | Hullette | H04L 51/04 |

(Continued)

FOREIGN PATENT DOCUMENTS

| | | |
|---|---|---|
| CN | 111756917 A | 10/2020 |

OTHER PUBLICATIONS

International Search Report and Written Opinion issued Jun. 21, 2023 in Application No. PCT/CN2023/088287 with English Translation, 20 pages.

*Primary Examiner* — Daniel Rodriguez
(74) *Attorney, Agent, or Firm* — ARENTFOX SCHIFF LLP

(57) ABSTRACT

In a method for acquiring a shared emotive image, a plurality of candidate contact identifiers is displayed. A user selection of a target contact identifier from the plurality of candidate contact identifiers is received. At least one emotive image corresponding to the target contact identifier is displayed. The at least one emotive image is shared by a target contact of the target contact identifier. A user selection of the shared emotive image from the at least one emotive image corresponding to the target contact identifier is received. An emotive image acquisition request is sent to the target contact corresponding to the target contact identifier. The emotive image acquisition request identifies the shared emotive image for which authorization is requested. The shared emotive image is added to an emotive image library based on the authorization to use the shared emotive image being received.

20 Claims, 12 Drawing Sheets

(56)                References Cited

U.S. PATENT DOCUMENTS

| | | | |
|---|---|---|---|
| 2021/0382590 A1* | 12/2021 | Fong | H04L 51/42 |
| 2022/0070125 A1* | 3/2022 | Vasamsetti | H04L 51/063 |
| 2022/0326846 A1* | 10/2022 | Park | G06F 3/04845 |
| 2022/0334652 A1* | 10/2022 | Bayer | G06F 40/53 |
| 2022/0335201 A1* | 10/2022 | Bayer | H04L 51/52 |
| 2022/0337540 A1* | 10/2022 | Bayer | G06F 3/04886 |
| 2023/0016941 A1* | 1/2023 | Yu | G06F 3/14 |
| 2023/0376186 A1* | 11/2023 | Boda | G06F 3/0482 |
| 2024/0019985 A1* | 1/2024 | Ye | G06F 3/04845 |

\* cited by examiner

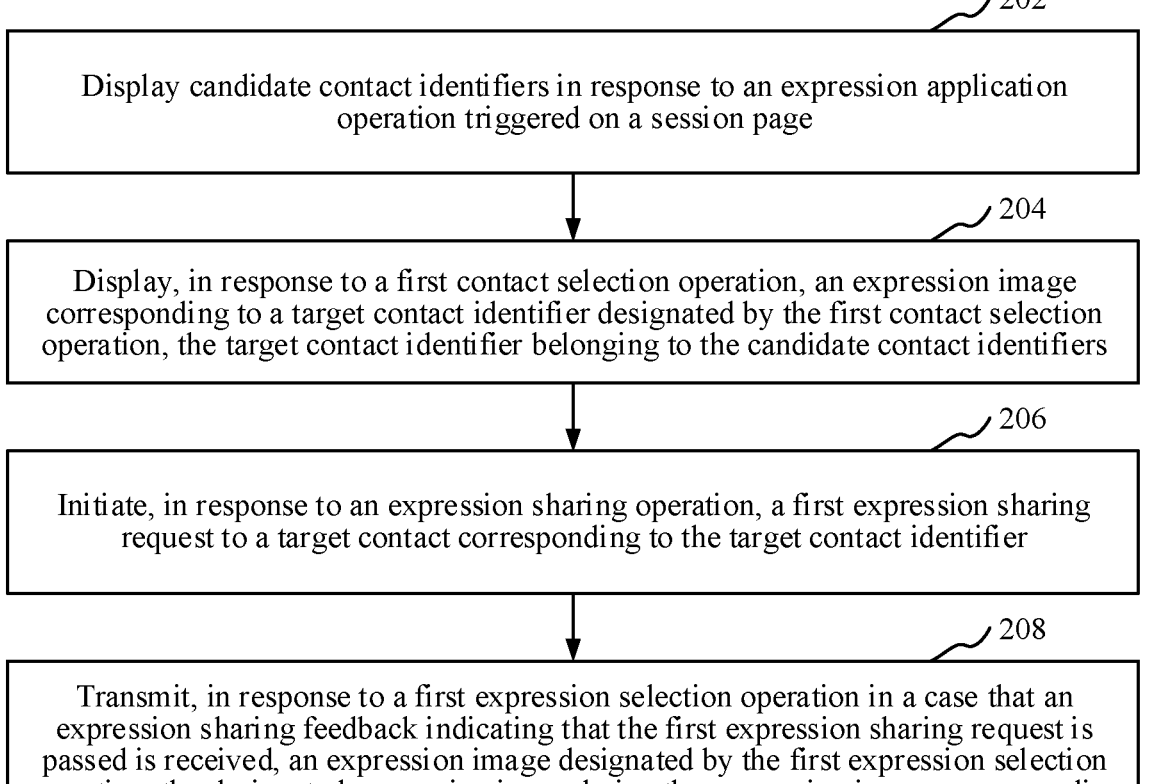

Display candidate contact identifiers in response to an expression application operation triggered on a session page Display, in response to a first contact selection operation, an expression image corresponding to a target contact identifier designated by the first contact selection operation, the target contact identifier belonging to the candidate contact identifiers Initiate, in response to an expression sharing operation, a first expression sharing request to a target contact corresponding to the target contact identifier Transmit, in response to a first expression selection operation in a case that an expression sharing feedback indicating that the first expression sharing request is passed is received, an expression image designated by the first expression selection operation, the designated expression image being the expression image corresponding to the target contact identifier

FIG. 2

Expression label corresponding to the friend-A

While(true)

{

Iterative
analysis

Look up to
the boss

Mate, drink
matcha from the
tea room

Distributed likes

Circle expressions

Server

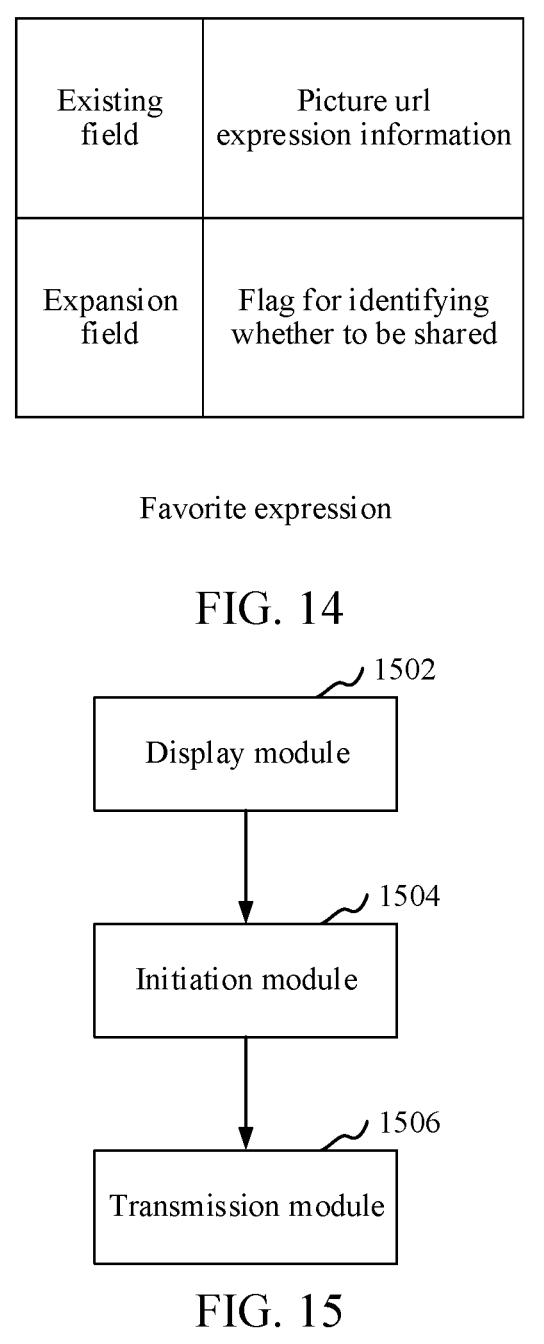

| Existing field | Picture url expression information |
|---|---|
| Expansion field | Flag for identifying whether to be shared |

Favorite expression

Display module

1504

Initiation module

1506

Transmission module

FIG. 15

EMOTIVE IMAGE SHARING

RELATED APPLICATIONS

This application is a continuation of International Application No. PCT/CN2023/088287, filed on Apr. 14, 2023, which claims priority to Chinese Patent Application No. 202211332307.2, entitled "METHOD AND APPARATUS FOR SHARING EXPRESSION IMAGE, COMPUTER DEVICE, AND STORAGE MEDIUM" and filed on Oct. 28, 2022. The entire disclosures of the prior applications are hereby incorporated by reference.

FIELD OF THE TECHNOLOGY

This application relates to the field of computer technologies, including to a method and an apparatus for sharing an expression image, a computer device, a storage medium, and a computer program product.

BACKGROUND OF THE DISCLOSURE

With development of computer technologies and Internet technologies, the advent of the 5G era and the emergence of the Internet have brought great convenience to modern life. More and more users can perform information sharing, emotional communication, service processing, and the like by using different application software, bringing convenience to the users. In current social software, users are allowed to save chat expressions by themselves in a chat scenario, or select and download expressions in an expression panel, which belongs to an expression transmission capability provided by a social software platform.

However, in a current manner for sharing an expression image, an expression library of a user is usually expanded by optimizing creative ecology of expression stores, actively favoring an expression in a chat scenario, and searching for an expression across the entire network. However, in a specific communication scenario and friend relationship, the expressions provided by the foregoing sources are relatively generic in design. As a result, it is difficult to obtain expressions that meet the user's needs, thus easily affecting effectiveness of communication.

SUMMARY

According to various embodiments of this disclosure, a method and an apparatus for sharing an expression image, a computer device, a computer-readable storage medium, and a computer program product are provided.

According to a first aspect, this disclosure provides a method for acquiring a shared emotive image. The method is performed by a computer device for example. In the method, a plurality of candidate contact identifiers is displayed in response to an emotive image application operation triggered by a user. A user selection of a target contact identifier from the plurality of candidate contact identifiers is received. At least one emotive image corresponding to the target contact identifier is displayed. The at least one emotive image is shared by a target contact of the target contact identifier. A user selection of the shared emotive image from the at least one emotive image corresponding to the target contact identifier is received. An emotive image acquisition request is sent to the target contact corresponding to the target contact identifier. The emotive image acquisition request identifies the shared emotive image for which authorization is requested. The shared emotive image is added to an emotive image library based on the authorization to use the shared emotive image being received.

According to a second aspect, this disclosure further provides an information processing apparatus including processing circuitry. The processing circuitry is configured to display a plurality of candidate contact identifiers in response to an emotive image application operation triggered by a user. The processing circuitry is configured to receive a user selection of a target contact identifier from the plurality of candidate contact identifiers. The processing circuitry is configured to display at least one emotive image corresponding to the target contact identifier. The at least one emotive image is shared by a target contact of the target contact identifier. The processing circuitry is configured to receive a user selection of the shared emotive image from the at least one emotive image corresponding to the target contact identifier. The processing circuitry is configured to send an emotive image acquisition request to the target contact corresponding to the target contact identifier. The emotive image acquisition request identifies the shared emotive image for which authorization is requested. The processing circuitry is configured to add the shared emotive image to an emotive image library based on the authorization to use the shared emotive image being received.

According to a third aspect, this disclosure further provides a computer device. The computer device includes a memory and one or more processors, the memory storing computer-readable instructions, and the processors, when executing the computer-readable instructions, implementing the method for acquiring a shared emotive image.

According to a fourth aspect, this disclosure further provides a non-transitory computer-readable storage medium. The computer-readable storage medium stores instructions which when executed by at least one processor cause the at least one processor to perform the method for acquiring a shared emotive image.

According to a fifth aspect, this disclosure further provides a computer program product. The computer program product includes computer-readable instructions, the computer-readable instructions, when executed by a processor, implementing the method for acquiring a shared emotive image.

Details of one or more embodiments of this disclosure are provided in the accompanying drawings and descriptions below. Other features and advantages of this disclosure become apparent with reference to the specification, the accompanying drawings, and the claims.

BRIEF DESCRIPTION OF THE DRAWINGS

To describe the technical solutions in embodiments of this disclosure more clearly, the following briefly describes the accompanying drawings required for describing the embodiments or exemplary technologies. The accompanying drawings in the following description show merely some embodiments of this disclosure. Other embodiments are within the scope of the present disclosure.

FIG. 2 is a schematic flowchart of a method for sharing an expression image according to an embodiment.

FIG. 14 is a schematic diagram of information for expanding a favorite expression according to an embodiment.

FIG. 15 is a structural block diagram of an apparatus for sharing an expression image according to an embodiment.

FIG. 16 is a diagram of an internal structure of a computer device according to an embodiment.

DESCRIPTION OF EMBODIMENTS

To make objectives, technical solutions, and advantages of this disclosure clearer and more understandable, this disclosure is further described with reference to the accompanying drawings and the embodiments. It is to be understood that the specific embodiments described herein are only examples used for explaining this disclosure, and are not used for limiting this disclosure.

Before the embodiments of this disclosure are described, some examples of terms involved in this disclosure are explained first.

A cloud technology is, for example, a hosting technology that unifies a series of resources such as hardware, software, and networks in a wide area network or a local area network to implement computing, storage, processing, and sharing of data.

The cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources, such as video websites, image websites, and more portal websites. As the Internet industry is highly developed and applied, each article may have its own identifier in the future and needs to be transmitted to a background system for logical processing. Data at different levels is separately processed, and data in various industries requires strong system support, which can only be implemented through cloud computing.

Cloud storage is developed from a concept of cloud computing. A distributed cloud storage system (hereinafter referred to as a storage system) is, for example, a storage system that integrates a large number of different types of storage devices (also referred to as storage nodes) in a network through application software or application interfaces to work together by using functions such as a cluster application, a grid technology and a distributed storage file system, to jointly provide functions of data storage and business access to the outside.

Figure 1:
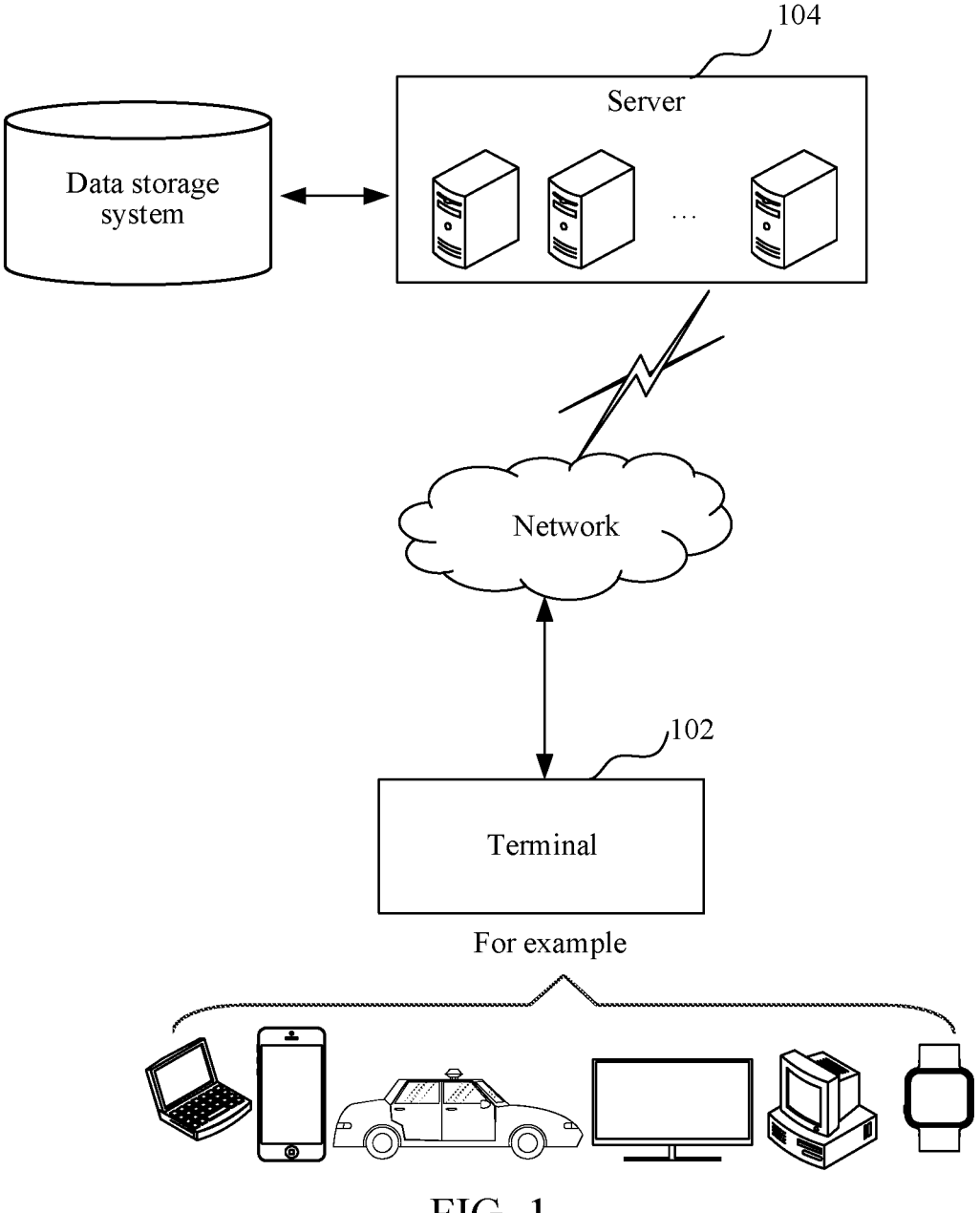
FIG. 1 is a diagram of an application environment of a method for sharing an expression image according to an embodiment.

A method for sharing an expression image provided in the embodiments of this disclosure may be applied to an application environment shown in FIG. 1. A terminal 102 communicates with a server 104 through a network. A data storage system may store data that the server 104 needs to process. The data storage system may be integrated on the server 104, or placed on the cloud or another server. In response to an expression application operation triggered on a session page, the terminal 102 may obtain candidate contact identifiers from a database of the server 104 on an application back end, and display the candidate contact identifiers. The terminal 102 displays, in response to a first contact selection operation, an expression image corresponding to a target contact identifier designated by the first contact selection operation, the target contact identifier belonging to the candidate contact identifiers. The terminal 102 initiates, in response to an expression sharing operation, a first expression sharing request to a target contact corresponding to the target contact identifier. In a case that the terminal 102 receives an expression sharing feedback indicating that the first expression sharing request is passed, the terminal 102 transmits, in response to a first expression selection operation, an expression image designated by the first expression selection operation, the designated expression image being the expression image corresponding to the target contact identifier.

The terminal 102 may be but is not limited to any desktop computer, notebook computer, smartphone, tablet computer, Internet of things device, or portable wearable device. The Internet of Things device may be a smart speaker, a smart TV, a smart air conditioner, a smart vehicle-mounted device, or the like. The portable wearable device may be a smart watch, a smart bracelet, a head-mounted device, or the like.

The server 104 may be implemented as an independent server or a server cluster formed by a plurality of servers. It may be understood that the server 104 provided in the embodiments of this disclosure may also be a service node in a blockchain system. A peer to peer (P2P) network is formed between service nodes in the blockchain system, and a P2P protocol is an application layer protocol that runs over a transmission control protocol (TCP).

In an embodiment, as shown in FIG. 2, a method for sharing an expression image is provided. By using an example in which the method is applied to the terminal in FIG. 1 for description, the method includes the following steps.

Step 202: Display candidate contact identifiers in response to an expression application operation triggered on a session page.

The session page is a page that is used for interaction and communication and that is provided for a user, and may also be referred to as a communication page (interface), a session interface, or the like. The session page in this application may include different types of session pages. For example, the session page may include at least one of a one-to-one single chat session page or a group chat session page involving a plurality of persons.

The expression application operation is an operation triggered by the user to apply for an expression image. A trigger operation of the user may trigger a trigger event in the terminal, namely, a screen input event (Input event). The trigger event may include a click event (click event), a touch event (touch-type event), a tap event (tap-type event), a swipe event (swipe-type event), or the like. In other words, the user may perform different trigger operations on a terminal device. For example, the expression application operation may trigger operation such as a click operation, a swipe operation, a long press operation, or shaking.

A contact identifier is identification information about a contact associated with an expression application operator. The contact identifier in this application includes but is not limited to a text identifier, an icon, or the like. For the candidate contact identifiers, one or more contact identifiers are selected from a plurality of pieces of information about contact identifiers associated with the expression application operator as the candidate contact identifiers. For example, it is assumed that there are 100 contact identifiers associated with an expression application operator A. In this case, according to quantities of times of interaction between the contact identifiers and the expression application operator A, contact identifications whose quantities of times of interaction are top 10 may be selected from information about the 100 contact identifiers associated with the expression application operator as candidate contact identifiers.

Specifically, the terminal displays, in response to the expression application operation triggered by the user on the session page, the candidate contact identifiers on the session page. To be specific, the user may log in to a communication application through a trigger operation, and further, the user may enter, through a trigger operation, a single chat or group chat session page in an interface displayed by the communication application. The displayed session page includes chat window components. For example, the session page includes a control for inputting text information, a control for transmitting voice, a control for entering an expression panel, and the like. Further, the user may trigger the expression application operation on the session page. In this case, the terminal selects, in response to the expression application operation triggered by the user on the session page, candidate contact identifiers of a preset quantity from contacts, and displays the candidate contact identifiers of the preset quantity on the session page, so that the user quickly check information related to candidate contacts.

Figure 3:
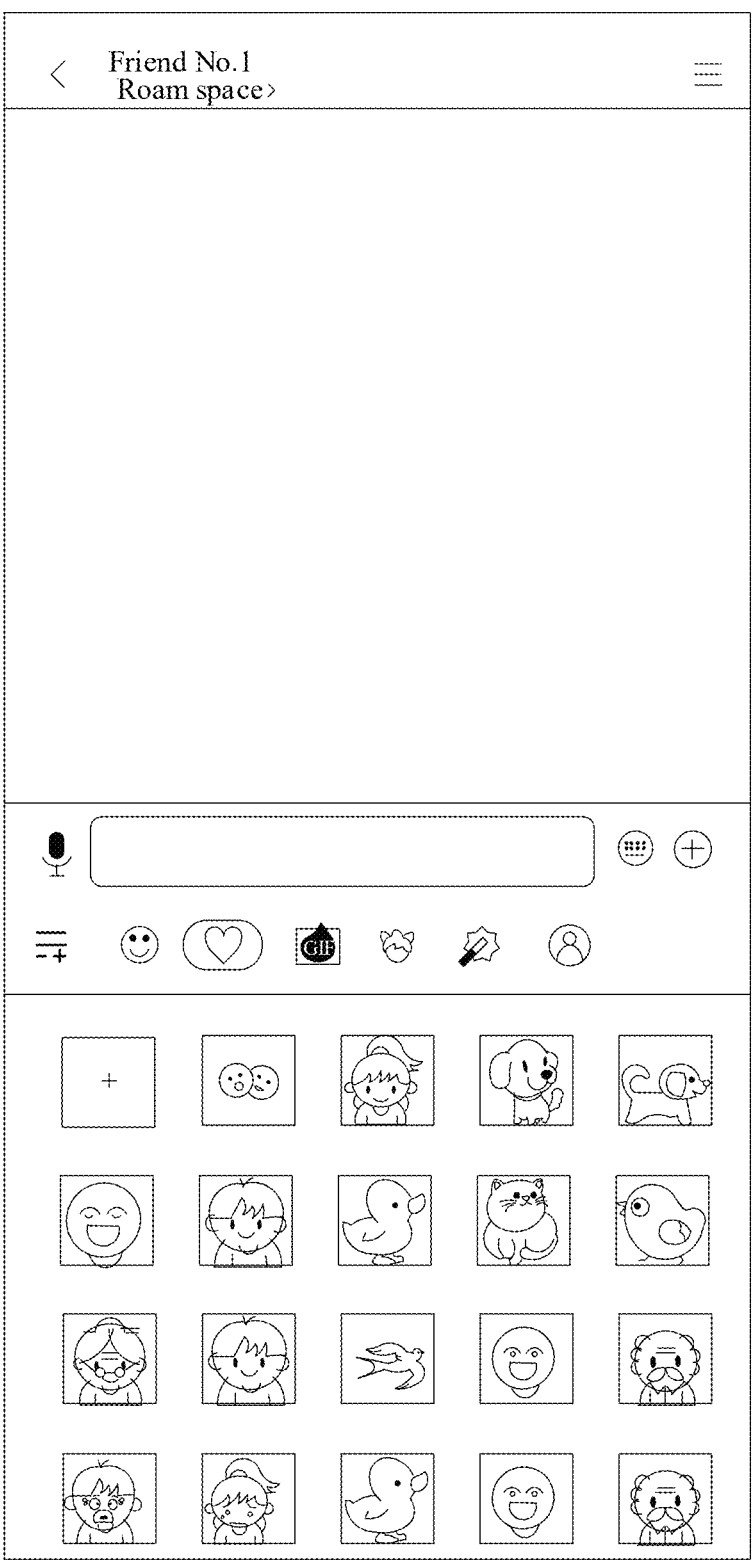
FIG. 3 is a schematic diagram of display of an interface for triggering an expression application operation on a session page according to an embodiment.
Figure 4:
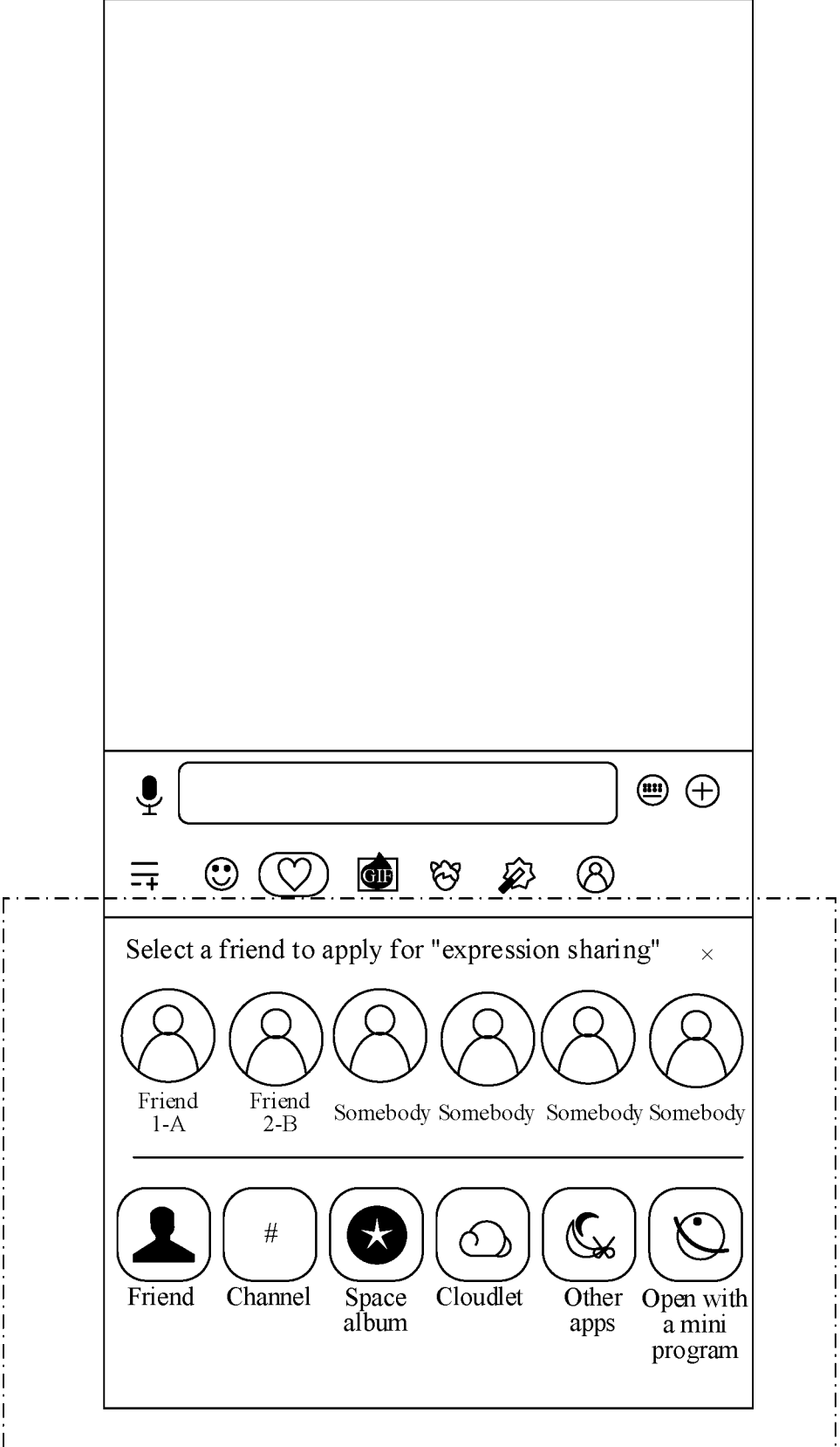
FIG. 4 is a schematic diagram of a page for displaying candidate contact identifiers according to an embodiment.

For example, FIG. 3 is a schematic diagram of display of an interface for triggering an expression application operation on a session page. A user A may start a communication application program A in the terminal through a trigger operation, and the user may log in to the communication application program A by inputting an account and a password. Further, on a session page displayed by the communication application program A shown in FIG. 3, the user A clicks a "+" entry for favorite expressions in an expression panel shown in FIG. 3. In response to a trigger operation of the user A, the terminal transmits a candidate contact information obtaining request of the user A to a back-end server of the communication application program A, so that the back-end server returns information related to candidate contacts associated with the user A. The terminal displays, based on the information related to the candidate contacts returned by the back-end server, identification information corresponding to the candidate contacts on the session page. For example, FIG. 4 is a schematic diagram of a page for displaying candidate contact identifiers. The page shown in FIG. 4 is a session page. The session page displayed in FIG.

4 includes an emoticon application floating layer page. A list of friends having a social relationship with the user A is displayed on the floating layer page. The list of friends includes a friend 1-A, a friend 2-B, and the like. In addition, on the floating layer page of the session page shown in FIG. 4, different contact list controls are also displayed. For example, the contact list controls shown in FIG. 4 include friend, channel, space album, and the like. To be specific, the terminal invokes, in response to the expression application operation triggered by the user on the session page, an emoticon application floating layer, and displays the candidate contact identifiers on the emoticon application floating layer of the session page shown in FIG. 4.

Step 204: Display, in response to a first contact selection operation, an expression image corresponding to a target contact identifier designated by the first contact selection operation, the target contact identifier belonging to the candidate contact identifiers.

The first contact selection operation is an operation triggered by the user to select a contact. In other words, the user may perform selection on the candidate contact identifiers displayed on the session page, to select the target contact identifier corresponding to a target contact.

For the target contact identifier, one or more contact identifiers are selected from different contact identifiers as target contact identifiers. For example, it is assumed that the list of friends having the social relationship with the user A displayed on the session page includes a friend 1-A, a friend 2-B, and a friend 3-C. In this case, the user may select the friend 1-A as the target contact identifier.

An expression image is an image having an expression function, and can reflect a mental activity, a mood, a feeling or a specific meaning of the user transmitting the expression image. The expression image in this disclosure may also be referred to as an expression, an emoticon, an expression match, or the like. The emoticon is an example of an emotive representation. The emoticon is a manner of expressing emotions through a picture. The expression image in this disclosure may be an emoticon favorited in social software. Emoticons are a popular culture formed after the social software became active. The emoticons are popular on the Internet, and basically every user posts emoticons. In the era of mobile Internet, people use popular celebrities, quotations, animations, and film and television screenshots as materials, and add a series of matching text, to express specific emotions.

The expression in this disclosure may include a static expression and/or an animated expression. The static expression is a static picture frame, and may be in a file format of portable network graphics (PNG). The animated expression is an animation synthesized by a plurality of picture frames, and may be in a file format of a GIF.

Specifically, after the terminal displays the candidate contact identifiers in response to the expression application operation triggered by the user on the session page, the terminal displays, in response to the first contact selection operation triggered by the user, the expression image corresponding to the target contact identifier designated by the first contact selection operation on the session page, the target contact identifier belonging to the candidate contact identifiers. The expression image corresponding to the target contact identifier displayed on the session page may be an expression custom-favorited by the target contact. The expression custom-favorited by the target contact may include: a custom expression and a general expression favorited from an expression mall or store. To be specific, the user may select an identifier of a specific friend from a plurality of candidate contact identifiers displayed on the session page, to initiate an application for "emoticon sharing". To be specific, the user may select, from a candidate contact list displayed on the session page, a friend identifier who hopes to apply for emoticons, so that when the initiated application for "emoticon sharing" is agreed by a friend corresponding to the friend identifier to authorize, the user may invoke expressions favorited by the friend.

Figure 5:
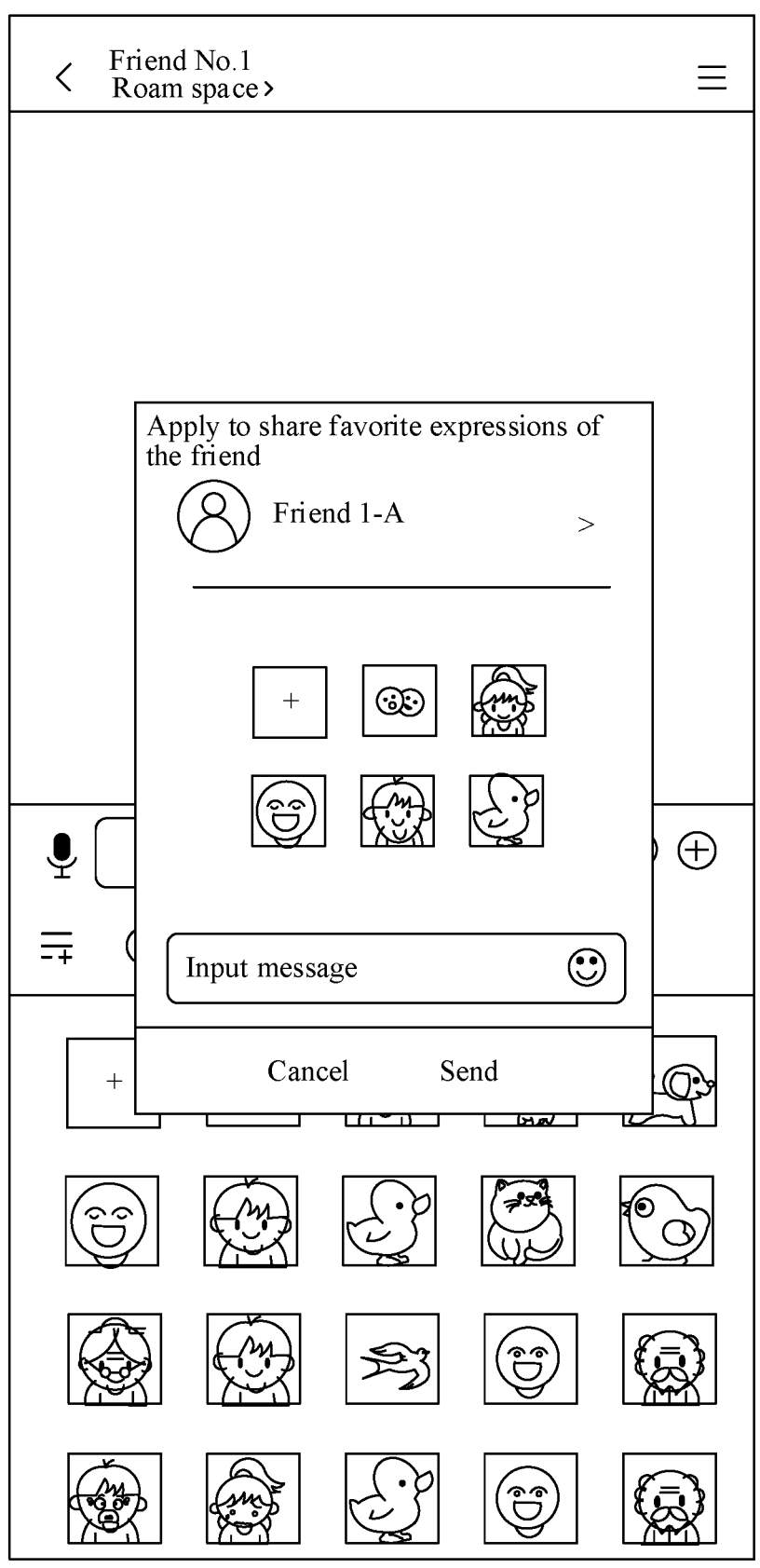
FIG. 5 is a schematic diagram of display of an interface for a secondary confirmation pop-up window after a user selects a specific friend according to an embodiment.

For example, FIG. 5 is a schematic diagram of display of an interface for a secondary confirmation pop-up window after a user selects a specific friend. It is assumed that after the terminal displays, based on the information related to the candidate contacts returned by the back-end server, the identification information corresponding to the candidate contacts shown in FIG. 4 on the emoticon application floating layer of the session page, the user may select the target contact identifier from the identification information corresponding to the candidate contacts displayed on the emoticon application floating layer of the session page. In addition, it is assumed that the user A selects an icon of the "friend 1-A" from the identification information corresponding to the candidate contacts shown in FIG. 4, in other words, the user A selects the "friend 1-A" as the target contact. In this case, in response to the contact selection operation of the user, the terminal may display, on a preview page of the secondary confirmation pop-up window of the session page, thumbnails of expression images corresponding to the target contact identifier, namely, the "friend 1-A", designated by the contact selection operation. For example, in the secondary confirmation pop-up window shown in FIG. 5, expression images favorited by the "friend 1-A" are displayed in a thumbnail manner. In addition, in the secondary confirmation pop-up window of the session page shown in FIG. 5, a message control, a send button, a cancel button, and the like are also displayed.

Step 206: Initiate, in response to an expression sharing operation, a first expression sharing request to a target contact corresponding to the target contact identifier.

The expression sharing operation is an operation triggered by the user to initiate an expression sharing request. For example, after the user A selects a target expression image from the expression images corresponding to the target contact identifier displayed on the session page, the user A may click the "send" button, to trigger the terminal to initiate the expression sharing request to the target contact corresponding to the target contact identifier.

For the target contact, a contact corresponding to the target contact identifier is the target contact. For example, a contact corresponding to the target contact identifier "friend 1-A" is A. In this case, A is the target contact.

The expression sharing request is a request for applying for a permission to use a selected expression image. When an expression sharing request initiated by an applicant is authorized by a friend, the applicant can invoke the expression image authorized by the friend. For example, if the user A intends to use an expression B favorited by a friend B, the user A may select the expression B favorited by the friend B on the preview page and initiate an expression sharing request to the friend B. The expression sharing request is a request for applying for a permission to use the selected expression B.

Specifically, after the terminal displays, in response to the first contact selection operation, the expression image corresponding to the target contact identifier designated by the first contact selection operation on the session page, the user may select, on the preview page of the secondary confirmation pop-up window of the session page, a part or all of expressions corresponding to the target contact identifier that the user hopes to apply for. For example, the user may click the preview page of the secondary confirmation pop-up window, to enter an expression management selection page. On the expression management selection page, the user may select all, with one click, or select a part of expression content that the user hopes to apply for. After the user completes selection, the user may click the "send" button in the secondary confirmation pop-up window on the session page shown in FIG. 5. The terminal initiates, in response to the expression sharing operation triggered by the user, the expression sharing request to the target contact corresponding to the target contact identifier. The expression sharing request is a request for applying for a permission to use an expression selected by the user. The target contact, namely, a respondent, can only receive an application for an expression that the applicant hopes to obtain authorization.

Step 208: Transmit, in response to a first expression selection operation in a case that an expression sharing feedback indicating that the first expression sharing request is passed is received, an expression image designated by the first expression selection operation, the designated expression image being the expression image corresponding to the target contact identifier.

In this disclosure, the expression sharing feedback indicating that the first expression sharing request is passed may be a feedback indicating that authorization is passed. That authorization is passed means that the first expression sharing request is agreed by a friend to authorize. For example, after the target contact corresponding to the target contact identifier receives the expression sharing request initiated by the applicant, the target contact returns a response message about agreeing to authorize, which means that the expression sharing feedback indicating that the first expression sharing request is passed is received. The expression sharing feedback indicates whether the authorization is passed.

The first expression selection operation is an operation triggered by the user to select an expression. For example, the first expression selection operation may be a click operation. To be specific, in a plurality of expression images displayed on the expression panel, the user may click on an expression image A, and the click operation indicates that the user has selected the expression image A.

The expression image designated by the first expression selection operation is an expression image selected by the user from expression images corresponding to the target contact identifier. For example, in expression images corresponding to one or more target contact identifiers displayed on the expression panel, the user may click on the expression image A, and the click operation indicates that the user has selected the expression image A. In this case, the expression image A is the expression image designated by the first expression selection operation. It may be understood that, in this embodiment of this disclosure, because expression images corresponding to one or more target contact identifiers are displayed on the expression panel, the expression image designated by the first expression selection operation triggered by the user is the expression image corresponding to the target contact identifier.

Specifically, after the terminal initiates, in response to the expression sharing operation triggered by the user, the first expression sharing request to the target contact corresponding to the target contact identifier, when the terminal receives the expression sharing feedback indicating that the first expression sharing request is passed, in other words, when the authorization for the first expression sharing request is passed, the terminal transmits, in response to the first expression selection operation triggered by the user on the session page, the expression image designated by the first expression selection operation. To be specific, when the authorization for the first expression sharing request is passed, the terminal may add a category of "expressions of friend A" in the expression panel of the current user. The applicant, namely, the user, may click on the category of "expressions of friend A", and select a favorite expression of the friend A from the expression panel for normal transmission. In authorized and shared expression A, expression B, and expression C displayed in the expression panel corresponding to the category of "expressions of friend A", the user may click on the "expression A". In this case, in response to an expression selection operation of the user, the terminal transmits an expression image designated by the expression selection operation, namely, the "expression A", to a chat session. The expression image, namely, the "expression A", designated by the expression selection operation belongs to the "expressions of friend A". In other words, in a session scenario in this embodiment of this disclosure, a transmit end is the terminal of the user. Because the expression sharing operation is performed on the session page, if the current session page is a chat page with a friend A, a receive end is a client of the friend A.

Figure 6:
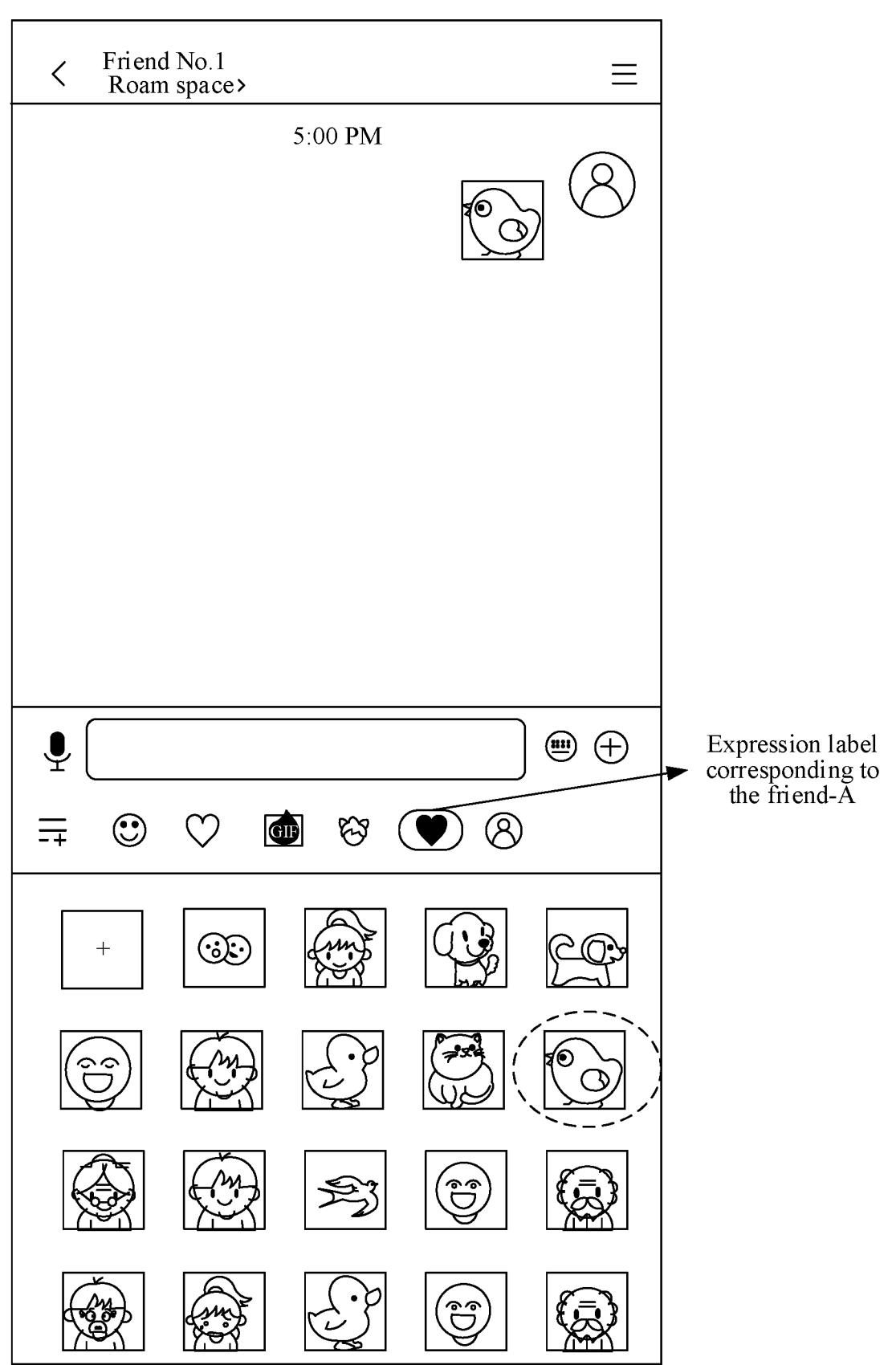
FIG. 6 is a schematic diagram of display of an interface for adding a category of favorite expressions of a friend in an expression panel of an applicant according to an embodiment.

For example, FIG. 6 is a schematic diagram of display of an interface for adding a category of favorite expressions of a friend in an expression panel of an applicant. When the user A receives the expression sharing feedback indicating that the first expression sharing request is passed, in other words, when the first expression sharing request transmitted by the user A to the "friend-A" is authorized, the terminal may add a category of "expressions of friend-A" in the expression panel of the current user A. The applicant, namely, the user A, may click an icon of the category of "expressions of friend-A", to display authorized favorite expression images of the friend-A shown in FIG. 6 in the expression panel. Further, the user A may select a "chicken expression" from the favorite expressions of the friend-A in the expression panel shown in FIG. 6. In this case, in response to an expression selection operation of the user A, the terminal transmits the expression image, namely, the "chicken expression", designated by the expression selection operation to a chat session. The "chicken expression" is displayed in chat content of the chat session, and the "chicken expression" is an authorized favorite expression image of the friend-A.

In this embodiment, candidate contact identifiers are displayed in response to an expression application operation triggered on a session page; an expression image corresponding to a target contact identifier designated by the first contact selection operation is displayed in response to a first contact selection operation, the target contact identifier belonging to the candidate contact identifiers; in response to an expression sharing operation, a first expression sharing request is initiated to a target contact corresponding to the target contact identifier; and in response to a first expression selection operation in a case that an expression sharing feedback indicating that the first expression sharing request is passed is received, an expression image designated by the first expression selection operation is transmitted, the expression image being the expression image corresponding to the target contact identifier. The first expression sharing request may be initiated to the target contact corresponding to the target contact identifier. Therefore, when the expression sharing feedback indicating that the first expression sharing request is passed is received, a user may transmit the expression image designated by the first expression selection operation, the designated expression image being the expression image corresponding to the target contact identifier. In other words, a part or all of favorite expression content of a friend is supported to be applied to be invoked. In this way, in a chat scenario of users in a specific circle, emoticon content of other contacts can be quickly invoked to expand an expression library of the user, and more accurate expression images are quickly found to convey emotions, thereby effectively improving social interaction experience of communication, and effectively improving a communication effect.

In an embodiment, before the displaying candidate contact identifiers in response to an expression application operation triggered on a session page, the method further includes:

displaying, in response to an expression management operation triggered on the session page, a favorite expression image of an operation object triggering the expression management operation; and using, in response to an expression sharing operation, a favorite expression image designated by the expression sharing operation as an expression image shared by the operation object with a contact.

The expression management operation is an operation triggered by the user to manage an expression image. For example, the user may enter a favorite expression management page through the triggered expression management operation. The user may set a favorite expression that is not allowed to be shared on the favorite expression management page. When a friend initiates an expression sharing application for the favorite expression that is set by the user and that is not allowed to be shared, even if the user selects to agree to authorize, such an expression is not synchronized to an expression panel of the friend. In addition, after the user enters the favorite expression management page through the triggered expression management operation, the user may also set a favorite expression that is allowed to be shared on the favorite expression management page. When a friend initiates an expression sharing application for the favorite expression that is set by the user and that is allowed to be shared, if the user selects to agree to authorize, such an expression is synchronized to an expression panel of the friend.

The operation object is a user triggering the expression management operation. For example, the user A enters the favorite expression management page through the triggered expression management operation. In this case, the user A is the operation object triggering the expression management operation.

The favorite expression image is an expression image favorited by the operation object. The favorite expression image may include a custom expression, a mall expression, an original expression, and the like, and may also include a static expression image or an animated expression image.

Specifically, before the terminal displays the candidate contact identifiers in response to the expression application operation triggered on the session page, the user may customize, on the favorite expression management page, a favorite expression that is not allowed to be shared, or a favorite expression that is allowed to be shared. In other words, the user may trigger the expression management operation on the session page. For example, the user may click an expression management icon on the session page. In this case, in response to an expression management operation triggered by the user on the session page, the terminal displays expression images locally favorited by an operation object triggering the expression management operation, namely, the user. Further, the user may select all or a part of expressions from the displayed locally favorited expression images, in other words, the user may select all, with one click, or select a part of expression content that is allowed to be shared with a friend. After the user completes selection, the user may trigger the expression sharing operation. For example, the user may click a "confirm" button, so that the terminal uses, in response to the expression sharing operation of the user, the favorite expression image designated by the expression sharing operation as an expression image shared by the user with another contact.

Figure 7:
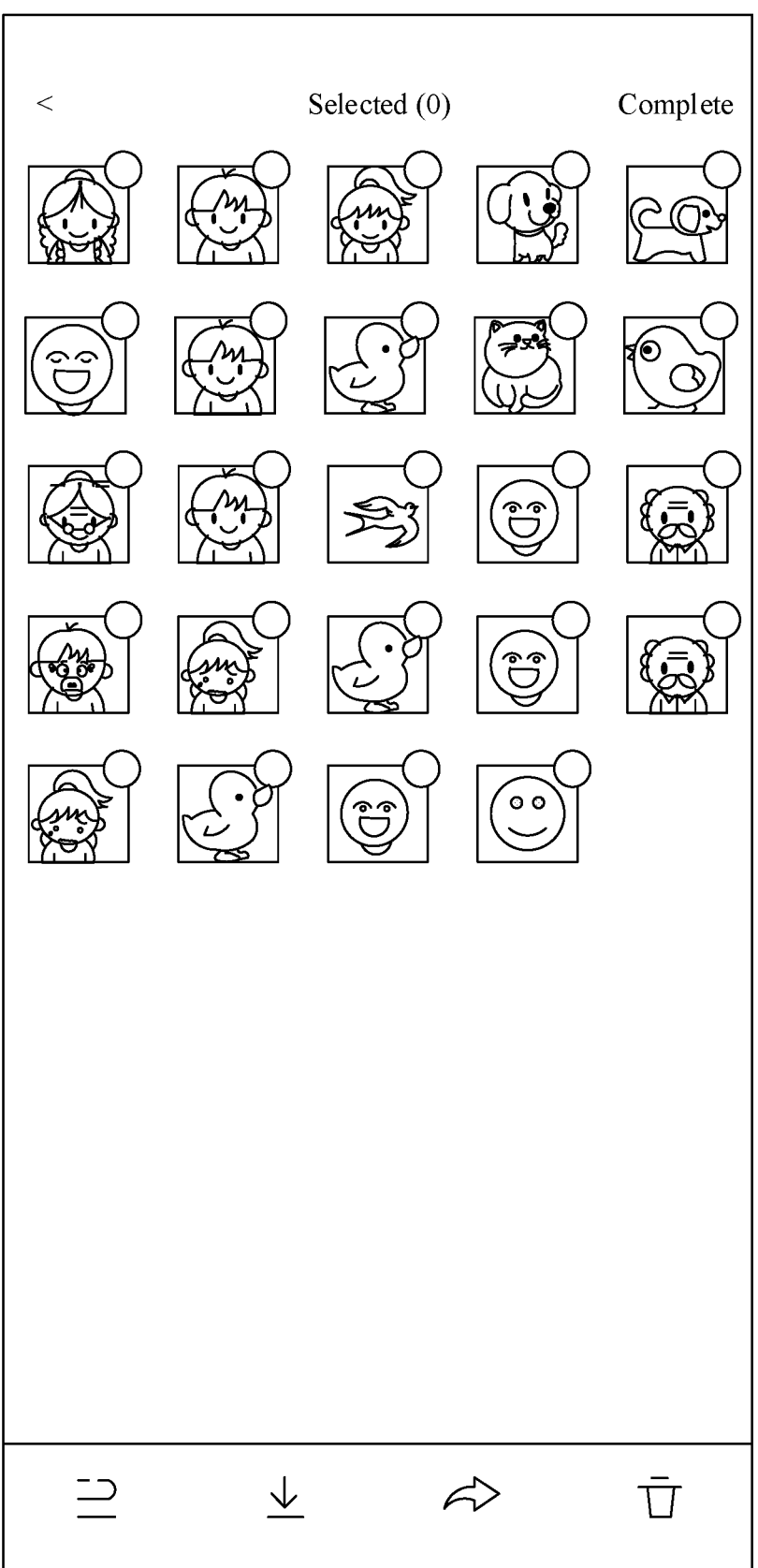
FIG. 7 is a schematic diagram of display of an interface for an expression management page according to an embodiment.
Figure 8:
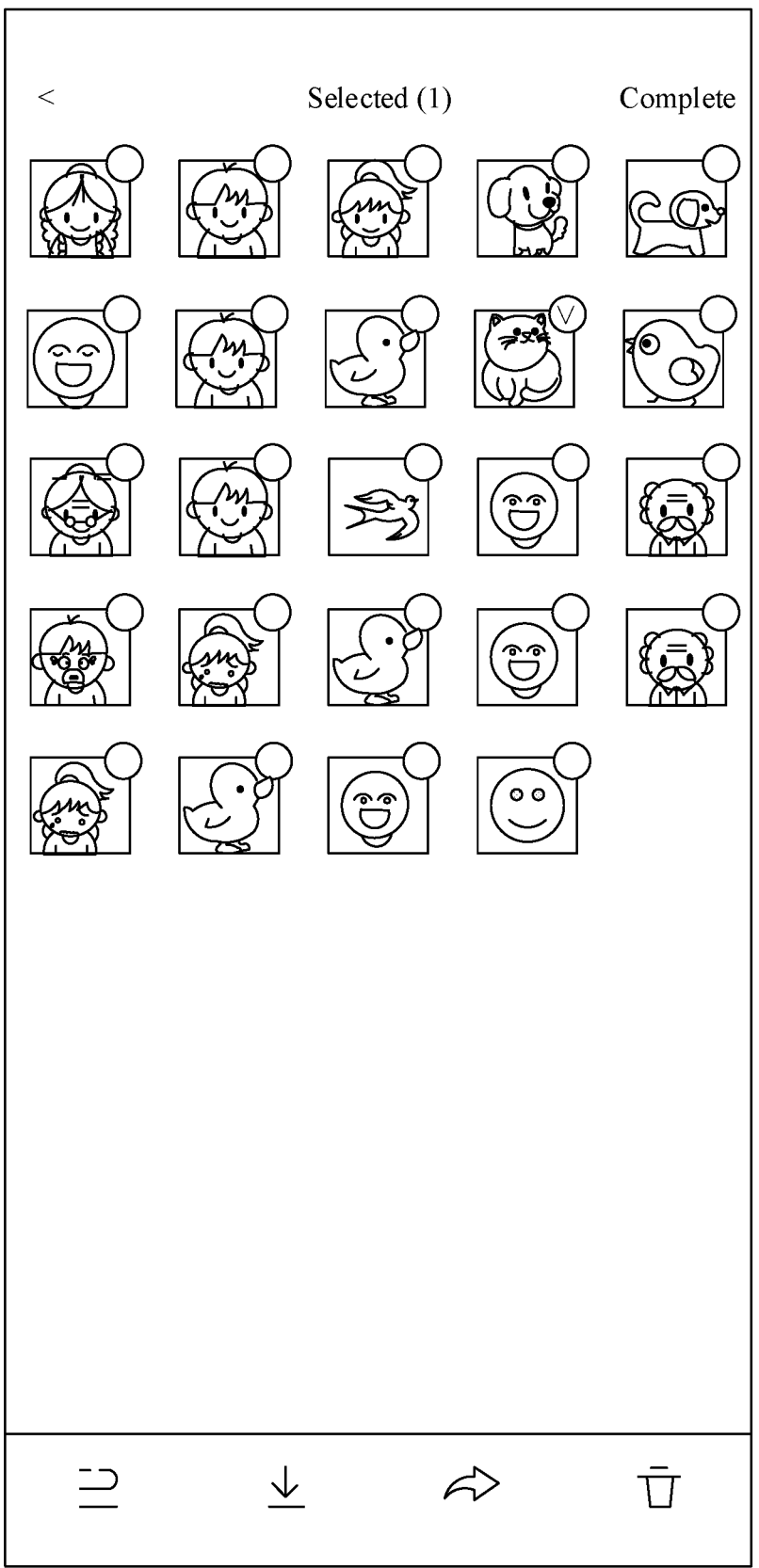
FIG. 8 is a schematic diagram of display of an interface for an expression management page after a user completes selection according to an embodiment.

For example, FIG. 7 is a schematic diagram of display of an interface of an expression management page. Before the terminal displays the candidate contact identifiers in response to the expression application operation triggered on the session page, the user may customize, on the favorite expression management page, a favorite expression that is not allowed to be shared, or a favorite expression that is allowed to be shared. It is assumed that the user A clicks an expression management icon on the session page. In this case, in response to an expression management operation triggered by the user A on the session page, the terminal displays expression images locally favorited by an operation object triggering the expression management operation, namely, the user A shown in FIG. 7. Further, the user A may select all or a part of expressions from the displayed locally favorited expression images shown in FIG. 7, in other words, the user may select all, with one click, or select a part of expression content that is allowed to be shared with a friend. For example, FIG. 8 is a schematic diagram of display of an interface for an expression management page after a user completes selection. To be specific, the user A selects a "cat expression" in a second row and a fourth column from the displayed locally favorited expression images shown in FIG. 7. After the user A completes selection, the user A may click a "complete" button on a page shown in FIG. 8. In this case, the terminal uses, in response to the expression sharing operation of the user, the favorite expression image, namely, the "cat expression", designated by the expression sharing operation, as an expression image shared by the user A with another contact.

In this embodiment, the user is supported to set a favorite expression that is allowed to be shared and a favorite expression that is not allowed to be shared, so that the user can apply to invoke a part or all of favorite expression content of a friend. In addition, the user is also supported to initiate a permission request to a corresponding friend when using an "emoticon sharing" function, to obtain relevant authorization for a part or all of the content and whether to perform real-time updating. In this way, when privacy, security, and compliance of an emoticon data resource invoking procedure are ensured, the user can flexibly configure shareable favorite expressions, thereby effectively improving flexibility of expression invoking.

In an embodiment, the displaying candidate contact identifiers in response to an expression application operation triggered on a session page includes: displaying an expression application subpage in response to the expression application operation triggered in an expression panel of the session page; and displaying the candidate contact identifiers on the expression application subpage.

The expression application subpage is a subpage of the session page. For example, the expression application subpage may be an emoticon application floating layer page displayed on the session page.

Specifically, FIG. 3 is a schematic diagram of display of an interface for triggering an expression application operation on a session page. On a session page displayed by a communication application shown in FIG. 3, a user A may click a "+" entry for favorite expressions in an expression panel shown in FIG. 3. In response to the click operation of the user A, the terminal transmits a candidate contact information obtaining request of the user A to a back-end server of the communication application program, so that the back-end server returns information related to candidate contacts associated with the user A. The terminal displays, based on the information related to the candidate contacts returned by the back-end server, icons and nicknames corresponding to the candidate contacts on the session page shown in FIG. 4. In other words, in response to the click operation of the user A, the terminal invokes an emoticon application floating layer, and displays a friend list corresponding to the user A on the emoticon application floating layer, so that the user A can select, from the friend list displayed on the emoticon application floating layer, a specific friend to initiate an application for "emoticon sharing". Content displayed in a dotted box in FIG. 4 may be the emoticon application floating layer. In this way, a part or all of favorite expression content of the friend is supported to be applied to be invoked. In this way, in a chat scenario of users in a specific circle, emoticon content of other contacts can be quickly invoked to expand an expression library of the user, and more accurate expressions are quickly found to convey emotions, thereby effectively improving social interaction experience of communication.

In an embodiment, the method further includes: displaying a contact list control on the expression application subpage; displaying, in a case that the candidate contact identifiers do not include the target contact identifier, a contact list designated by the contact list control in response to a trigger operation for the contact list control; and displaying, in response to a second contact selection operation, an expression image corresponding to a target contact identifier designated by the second contact selection operation.

The contact list control is a page interaction control for providing the contact list for the user when performing interaction with the user. For example, the contact list control may be displayed as an icon, and the user clicks the icon to obtain identification information of all contacts in contacts.

Specifically, on the session page displayed by the communication application shown in FIG. 3, the user may click the "+" entry for favorite expressions in the expression panel shown in FIG. 3. In this case, in response to an expression application operation triggered by the user on the expression panel of the session page, the terminal displays an expression application subpage shown in FIG. 4, and displays candidate contact identifiers and contact list controls on the expression application subpage. For example, in the dotted box, namely, the emoticon application floating layer, shown in FIG. 4, the candidate contact identifiers are displayed in a first column, and the contact list controls are displayed in a second column. It is assumed that the user intends to apply for expression images favorited by a friend-candy, but an identifier of the "friend-candy" is not displayed in the candidate contact identifiers displayed in FIG. 4, in other words, the candidate contact identifiers do not include a target contact identifier, namely, the identifier of the "friend-candy". In this case, the user may select a target contact list control from the contact list controls displayed in the second column. In this case, in response to a trigger operation of the user for the contact list control, the terminal displays a contact list designated by the contact list control. Further, the user may select the target contact identifier, namely, the identifier of the "friend-candy", from the displayed contact list designated by the contact list control. In this case, in response to the second contact selection operation of the user, the terminal displays an expression image corresponding to the identifier of the "friend-candy" designated by the second contact selection operation.

For example, it is assumed that the user A intends to apply for expression images favorited by a friend-C, but an identifier of the "friend-C" is not displayed in the candidate contact identifiers displayed in FIG. 4, in other words, the candidate contact identifiers do not include the identifier of the "friend-C". In this case, the user A may select a target contact list control "friend" from the contact list controls displayed in FIG. 4. For example, from the contact list controls displayed in FIG. 4, the user A may click the "friend" control in the contact list controls. In this case, in response to a click operation of the user for the contact list control, the terminal displays a friend list including all friends corresponding to the "friend" control. Further, the user A may select the identifier of the target friend "friend-C" in the displayed friend list. In this case, in response to the selection operation of the user, the terminal displays expression images corresponding to the identifier of the "friend-C" designated by the selection operation, that is, displays the expression images favorited by the "friend-C", so that the user A can select, from the displayed expression images favorited by the "friend-C", an expression image that the user A intends to apply for to share. In this way, users in a same group are supported to apply for each other to invoke expression content, which can expand a reach path of such "circle expressions", accurately convey emotional interaction within a "circle", and improve social experience of transmission and receiving communication of expressions among people in a specific circle.

In an embodiment, the session page is a page for information interaction in a first application program; and the contact list control includes a control linked to a contact list of the first application program, a control linked to a contact list of a subapplication, or a control linked to a contact list of a second application program, where the subapplication is an application program running in a system environment provided by the first application program. In other words, the currently displayed session page may be the page for information interaction in the first application program. When the user intends to apply for expression images favorited by a friend but the friend is not in a currently used friend list of the first application program, the user may also perform interaction through the control linked to the contact list of the second application program displayed on the session page, to obtain the contact list of the second application program and select a target friend from the contact list.

FIG. 4 is a schematic diagram of a page for displaying candidate contact identifiers. A session page displayed in FIG. 4 includes an emoticon application floating layer page. A list of friends having a social relationship with a user A is displayed on the floating layer page. The list of friends includes a friend 1-A, a friend 2-B, and the like. In addition, on the floating layer page of the session page shown in FIG. 4, different contact list controls are also displayed. For example, on the floating layer page of the session page shown in FIG. 4, a control "friend" linked to the contact list of the first application program, a control "channel" linked to the contact list of the subapplication, a control "space album", and a control "other apps" linked to a contact list of another application program are also displayed. It is assumed that the currently displayed session page shown in FIG. 4 is a page for information interaction in an application program A, and the user A intends to apply for expression images favorited by a "friend-C", but the "friend-C" is not in a currently used friend list of the application program A. In other words, an identifier of the "friend-C" is not displayed in candidate contact identifiers displayed in FIG. 4, and after the user clicks the control "friend" linked to the contact list of the application program A, all displayed contact lists of the application program A do not include the identifier of the "friend-C". In this case, on the floating layer page of the session page shown in FIG. 4, the user may further click the control "other applications" linked to a contact list of another application program, to enter a display page of a contact list of the "other apps", and select the identifier of the target friend "friend-C" from the contact list of the "other apps". In this way, users in a same group are supported to apply for each other to invoke expression content, which can expand a reach path of such "circle expressions", accurately convey emotional interaction within a "circle", and improve social experience of transmission and receiving communication of expressions among people in a specific circle.

In an embodiment, the candidate contact identifiers include local contact identifiers of a preset quantity; and the displaying the candidate contact identifiers on the expression application subpage includes: determining quantities of times of interaction between an operation object and global contacts; determining display priorities of the global contacts according to the quantities of times of interaction; selecting, in contact identifiers corresponding to the global contacts, contact identifiers of a preset quantity according to the display priorities, and using the selected contact identifiers as the local contact identifiers; and displaying the local contact identifiers on the expression application subpage.

The global contacts are all contacts corresponding to the operation object in the application program. For example, if the communication application program A used by the user A includes added 50 contacts, global contacts of the user A are the added 50 contacts.

A display priority is a priority displayed in order on a page. For example, assuming that a quantity of times of interaction between the user A and a friend B in a recent week is greatest, the friend B has a highest display priority. For example, a friend with a highest display priority may be preferably displayed on a specific position of the page.

The local contacts are a part of contacts corresponding to the operation object in the application program, and belong to one or a part of the global contacts. For example, if the communication application program A used by the user A includes added 50 contacts, local contacts of the user A may be three contacts in the added 50 contacts. The local contact identifiers are identifiers corresponding to the local contacts.

Specifically, in response to the expression application operation triggered by the user on the session page, the terminal displays the candidate contact identifiers on the expression application subpage of the session page, where the candidate contact identifiers displayed by the terminal are the local contact identifiers of the preset quantity. In other words, the candidate contact identifiers displayed on the expression application subpage of the session page are limited, and the terminal may select and display, according to a preset rule or strategy, the contact identifiers of the preset quantity as the candidate contact identifiers on the expression application subpage. In other words, in response to the expression application operation triggered by the user on the session page of the application program, the terminal determines the quantities of times of interaction between the operation object, namely, the user, and the global contacts in the application program, and determines the display priorities of the global contacts according to the quantities of times of interaction. Further, the terminal may select, in the contact identifiers corresponding to the global contacts, the contact identifiers of the preset quantity according to the display priorities, and use the selected contact identifiers as the local contact identifiers. The terminal displays the local contact identifiers on the expression application subpage.

For example, FIG. 3 is a schematic diagram of display of an interface for triggering an expression application operation on a session page. On the session page displayed by the communication application program A shown in FIG. 3, the user A may click the "+" entry for favorite expressions in the expression panel shown in FIG. 3. In this case, in response to the click operation of the user A, the terminal determines quantities of times of interaction between the operation object, namely, the user A, and global contacts in the application program A, and determines display priorities of the global contacts according to the quantities of times of interaction. Further, the terminal may select, in contact identifiers corresponding to the global contacts, contact identifiers of a preset quantity according to the display priorities, and use the selected contact identifiers as local contact identifiers. For example, it is assumed that the terminal determines that a contact with a greatest quantity of times of interaction between the operation object, namely, the user A, and the global contacts in the application program A is the friend 1-A. In this case, in response to the expression application operation triggered by the user A on the session page, the terminal displays, on the emoticon application floating layer of the session page shown in FIG. 4, six local contact identifiers according to display priorities. Because the quantity of times of interaction between the user A and the "friend 1-A" is greatest, it is determined that the "friend 1-A" has a highest display priority, and the identifier of the "friend 1-A" is preferably displayed on a first position of a column of the candidate contact identifiers. In this way, users in a same group are supported to apply for each other to invoke expression content, which can expand a reach path of such "circle expressions", accurately convey emotional interaction within a "circle", and improve social experience of transmission and receiving communication of expressions among people in a specific circle.

In an embodiment, the displaying, in response to a first contact selection operation, an expression image corresponding to a target contact identifier designated by the first contact selection operation includes: displaying, in response to the first contact selection operation, an expression preview subpage on the session page; and displaying, on the expression preview subpage, the expression image corresponding to the target contact identifier designated by the first contact selection operation.

The expression preview subpage is a subpage of the session page. For example, the expression preview subpage may be a pop-up window displayed on the session page, and the expression image corresponding to the target contact identifier is displayed on the pop-up window page.

Specifically, after the terminal displays the candidate contact identifiers in response to the expression application operation triggered by the user on the session page, the user may select, from the displayed candidate contact identifiers, the target contact identifier on which the user intends to perform an expression sharing application. In this case, in response to the contact selection operation triggered by the user, the terminal displays the expression preview subpage on the session page, and displays the expression image corresponding to the target contact identifier designated by the contact selection operation on the expression preview subpage. The expression preview subpage displayed on the session page may be a pop-up window page, and the expression image corresponding to the target contact identifier displayed on the expression preview subpage may be a thumbnail of the expression image. Because shared expression resources are all stored in a local server or a cloud server, downloading may be performed as required in a process of synchronizing favorite expressions of a friend. To be specific, when the expression panel is displayed on the expression preview subpage, only thumbnail resources of the expressions can be downloaded; and when the user needs to transmit a specific shared favorite expression, all other related resources are continued to be downloaded for display. The advantage of this is that a quantity and an overall size of downloaded expression resources are reduced, and encoding and decoding steps of the resources are streamlined, making the application program run more smoothly. In addition, traffic costs of transmitting emoticon resources between a server end and a client are also saved.

For example, FIG. 5 is a schematic diagram of display of an interface for a secondary confirmation pop-up window after a user selects a specific friend. After the terminal displays the candidate contact identifiers shown in FIG. 4 in response to the expression application operation triggered by the user A on the session page, the user A may select, from the displayed candidate contact identifiers, the target contact identifier on which the user intends to perform an expression sharing application. It is assumed that the user A selects the icon of the "friend 1-A" from the identification information corresponding to the candidate contacts shown in FIG. 4, in other words, the user A selects the "friend 1-A" as the target contact. In this case, in response to the contact selection operation of the user A, the terminal may display, on the preview page of the secondary confirmation pop-up window of the session page, the thumbnails of the expression images corresponding to the target contact identifier, namely, the "friend 1-A", designated by the contact selection operation shown in FIG. 5. For example, on the preview page of the secondary confirmation pop-up window shown in FIG. 5, five expression images favorited by the "friend 1-A" are displayed. In this way, a quantity and an overall size of downloaded expression resources are reduced, and encoding and decoding steps of the resources are streamlined, making the application program run more smoothly. In addition, traffic costs of transmitting emoticon resources between a server end and a client are also saved.

In an embodiment, the expression preview subpage includes a message control; and the initiating, in response to an expression sharing operation, a first expression sharing request to a target contact corresponding to the target contact identifier includes: displaying edited message text in response to an editing operation triggered on the message control; and initiating, in response to the expression sharing operation, the first expression sharing request carrying the message text to the target contact corresponding to the target contact identifier.

The message control is a page interaction control for providing a message function for the user when performing interaction with the user. For example, the message control may be displayed as an icon, and the user clicks the icon to display a to-be-edited message text box. The message text includes text content and an expression image. In other words, when the user edits message content, the user may also input an expression symbol, an expression image, and the like for expressing emotions.

Specifically, after the terminal displays, in response to the first contact selection operation triggered by the user, the expression image corresponding to the target contact identifier designated by the first contact selection operation, the user may click the message control on the expression preview subpage displayed on the session page. In this case, in response to the editing operation triggered by the user on the message control, the terminal displays the edited message text. Further, the user may trigger the expression sharing operation on the expression preview subpage displayed on the session page. For example, the user may click a "send" button displayed on the expression preview subpage. In this case, in response to the expression sharing operation of the user, the terminal initiates the expression sharing request carrying the message text to the target contact corresponding to the target contact identifier.

For example, FIG. 5 is a schematic diagram of display of an interface for a secondary confirmation pop-up window after a user selects a specific friend. In the secondary confirmation pop-up window shown in FIG. 5, the expression images favored by the "friend 1-A" are displayed in a thumbnail manner. In addition, in the secondary confirmation pop-up window of the session page shown in FIG. 5, the message control, the send button, and the cancel button are also displayed. When the user intends to make a friend, namely, a respondent, quickly agree to authorize the expression sharing request, the user may click the message control on the pop-up window page displayed on the session page shown in FIG. 5. In this case, the terminal displays the edited message text in response to the editing operation triggered by the user on the message control. The message text edited by the user may be a secret code commonly used in private or content indicating an intimate relationship. For example, it is assumed that the message text edited by the user is: Your little baby. After the user has edited the message text, the user may trigger the expression sharing operation on the pop-up window page shown in FIG. 5. For example, the user may click the "send" button displayed on the pop-up window page. In this case, in response to the click operation of the user, the terminal initiates the expression sharing request carrying the message text "Your little baby" to the target contact corresponding to the target contact identifier, namely, the "friend 1-A". In this way, a message is transmitted when a part or all of favorite expression content of the friend is supported to be applied to be invoked. In this way, in a chat scenario of users in a specific circle, emoticon content of other contacts can be quickly invoked to expand an expression library of the user, and more accurate expressions are quickly found to convey emotions, thereby effectively improving social interaction experience of communication, and effectively improving a communication effect.

In an embodiment, the displaying, on the expression preview subpage, the expression image corresponding to the target contact identifier designated by the first contact selection operation includes: displaying, on the expression preview subpage in a thumbnail manner, the expression image corresponding to the target contact identifier designated by the first contact selection operation; or determining display priorities of expression images according to use frequencies of the expression images, and displaying, according to the display priorities, expression images of a preset quantity corresponding to the target contact identifier on the expression preview subpage.

Specifically, after the terminal displays the candidate contact identifiers in response to the expression application operation triggered by the user on the session page, the user may select the target contact identifier from the displayed candidate contact identifiers. In this case, in response to the contact selection operation triggered by the user, the terminal displays, on the expression preview subpage of the session page in the thumbnail manner, the expression image corresponding to the target contact identifier designated by the contact selection operation.

Alternatively, the terminal may determine the display priorities of the expression images according to the use frequencies of the expression images, and display, according to the display priorities, the expression images of the preset quantity corresponding to the target contact identifier on the expression preview subpage.

For example, FIG. 5 is a schematic diagram of display of an interface for a secondary confirmation pop-up window after a user selects a specific friend. It is assumed that the user A selects the icon of the "friend 1-A" from the identification information corresponding to the candidate contacts shown in FIG. 4, in other words, the user A selects the "friend 1-A" as the target contact. In this case, in response to the contact selection operation of the user, the terminal may display, on the preview page of the secondary confirmation pop-up window of the session page, the thumbnails of the expression images corresponding to the target contact identifier, namely, the "friend 1-A", designated by the contact selection operation. For example, in the secondary confirmation pop-up window shown in FIG. 5, five expression images favored by the "friend 1-A" are displayed in the thumbnail manner. Alternatively, the terminal may determine the display priorities of the expression images according to the use frequencies of the expression images, and display, according to the display priorities, the expression images of the preset quantity corresponding to the target contact identifier on the expression preview subpage. For example, according to use frequencies of the expression images, the terminal may determine that a "double smile face" expression has a highest usage frequency. In this case, the "double smile face" expression has a highest display priority, and the terminal displays, according to the display priority, the "double smile face" expression on a first position of the expression preview page of the secondary confirmation pop-up window shown in FIG. 5. In this way, a part or all of favorite expression content of the friend is supported to be applied to be invoked. In this way, in a chat scenario of users in a specific circle, emoticon content of other contacts can be quickly invoked to expand an expression library of the user, and more accurate expressions are quickly found to convey emotions, thereby effectively improving social interaction experience of communication, and effectively improving a communication effect.

In an embodiment, the expression image corresponding to the target contact identifier is displayed on an expression preview subpage of the session page; before the initiating, in response to an expression sharing operation, a first expression sharing request to a target contact corresponding to the target contact identifier, the method further includes: displaying an expression management page in response to an expression management operation triggered on the expression preview subpage, where the expression management page includes the expression image corresponding to the target contact identifier; and setting, in response to a second expression selection operation, an expression image designated by the second expression selection operation as a selected state. In an embodiment, the initiating, in response to an expression sharing operation, a first expression sharing request to a target contact corresponding to the target contact identifier includes: initiating, in response to the expression sharing operation, the first expression sharing request for the expression image in the selected state to the target contact corresponding to the target contact identifier.

The expression management operation is an operation triggered by the user to manage an expression image. For example, the user may enter an expression management page through the triggered expression management operation. The user may select all, with one click, or select a part of expression content that the user hopes to apply for on the expression management page. After the user completes selection, a respondent can only receive an application for an expression selected by the user who hopes to obtain authorization.

The selected state is a state that has been selected by the user. For example, the terminal may use, on the page, an icon or mark symbol to identify that a state of the expression image is the selected state.

Specifically, after the terminal displays, on the preview page of the secondary confirmation pop-up window of the session page in response to the first contact selection operation triggered by the user, the expression image corresponding to the target contact identifier designated by the first contact selection operation, the user may click the preview page of the secondary confirmation pop-up window, to enter the expression management page. In other words, in response to the expression management operation triggered by the user on the preview page of the secondary confirmation pop-up window, the terminal displays the expression management page, where the expression management page includes the expression image corresponding to the target contact identifier. In this way, the user may select all, with one click, or select a part of expression images that the user hopes to apply for from the expression image corresponding to the target contact identifier displayed on the expression management page. In this case, in response to the expression selection operation of the user, the terminal sets the expression image designated by the expression selection operation as the selected state. Further, in response to the expression sharing operation triggered by the user, the terminal initiates the expression sharing request for the expression image in the selected state to the target contact corresponding to the target contact identifier. In other words, an expression image requested by the expression sharing request for authorization is the expression image in the selected state.

For example, it is assumed that the user A selects the icon of the "friend 1-A" from the identification information corresponding to the candidate contacts shown in FIG. 4, in other words, the user A selects the "friend 1-A" as the target contact. In this case, after the terminal displays, on the preview page of the secondary confirmation pop-up window of the session page in response to the contact selection operation of the user, the thumbnails of the expression images corresponding to the "friend 1-A" designated by the contact selection operation shown in FIG. 5, the user may click the preview page of the secondary confirmation pop-up window shown in FIG. 5, to enter the expression management page. The expression management page may be a schematic diagram of display of an interface of an expression management page shown in FIG. 7. The expression management page displayed in FIG. 7 includes all expression images corresponding to the identifier of the "friend 1-A", so that the user may select all, with one click, or select a part of expression images that the user hopes to apply for from expression images displayed on the expression management page. For example, it is assumed that the user A selects a "cat expression" in a second row and a fourth column on the expression management page displayed in FIG. 7. In this case, in response to the expression selection operation of the user, the terminal sets the "cat expression" designated by the expression selection operation as the selected state. For example, the selected state of "√" is displayed in a mark box of a top right corner of the "cat expression". Further, after the user A completes selection, the user A may click a "complete" button on a page shown in FIG. 8. In this case, in response to the expression sharing operation of the user, the terminal initiates an expression sharing request for the "cat expression" in the selected state to the target contact, namely, the "friend 1-A", corresponding to the target contact identifier. In other words, the user may click the "complete" button on the page shown in FIG. 8, to trigger the terminal to initiate the expression sharing request for the "cat expression" in the selected state to the target contact, the "friend 1-A", corresponding to the target contact identifier.

In addition, after the user A completes selection, the user A may click the "complete" button on the page shown in FIG. 8. In this case, in response to the click operation of the user, the terminal returns to the session page including the secondary confirmation pop-up window shown in FIG. 5, and the user A may click the "send" button in the secondary confirmation pop-up window of the session page shown in FIG. 5, to trigger the terminal to initiate the expression sharing request for the "cat expression" in the selected state to the target contact, the "friend 1-A", corresponding to the target contact identifier.

In this embodiment, a part or all of favorite expression content of the friend is supported to be applied to be invoked. In this way, in a chat scenario of users in a specific circle, emoticon content of other contacts can be quickly invoked to expand an expression library of a user, and more accurate expressions are quickly found to convey emotions, thereby effectively improving social interaction experience of communication, and effectively improving a communication effect.

In an embodiment, the transmitting, in response to a first expression selection operation in a case that an expression sharing feedback indicating that the first expression sharing request is passed is received, an expression image designated by the first expression selection operation includes: displaying, in a case that the expression sharing feedback indicating that the first expression sharing request is passed is received, a target contact expression label in an expression panel of the session page; displaying, in response to a trigger operation for the target contact expression label, the expression image corresponding to the target contact identifier in the expression panel; and transmitting, in response to the first expression selection operation, the expression image designated by the first expression selection operation.

A contact expression label is an expression label corresponding to a different contact displayed in the expression panel. For example, an expression label of a contact A is displayed as an icon in the expression panel, and the icon may be an icon associated with the contact A. For example, the expression label of the contact A is displayed as an avatar icon of the contact A.

Specifically, after the terminal initiates, in response to the expression sharing operation triggered by the user, the first expression sharing request to the target contact corresponding to the target contact identifier, when the terminal receives the expression sharing feedback indicating that the first expression sharing request is passed, in other words, when the first expression sharing request is authorized by the target contact, the terminal may add a label of a category of "expressions of the target contact" in the expression panel of the current user, namely, the applicant, and display the added target contact expression label in the expression panel of the session page. The user may click the label of the category of "expressions of the target contact", and select expressions favorited by the target contact for transmission. In other words, in response to a click operation of the user for the target contact expression label, the terminal displays expression images corresponding to the target contact identifier under the label in the expression panel. Further, the user may select a to-be-transmitted expression image from the expression images corresponding to the target contact identifier under the label displayed in the expression panel. In this case, in response to the expression selection operation of the user, the terminal transmits the expression image designated by the expression selection operation to a session chat.

For example, FIG. 6 is a schematic diagram of display of an interface for adding a category of favorite expressions of a friend in an expression panel of an applicant. When the terminal receives the expression sharing feedback indicating that the first expression sharing request is passed, in other words, when the expression sharing request transmitted by the user A to the "friend-A" is authorized by the "friend-A", the terminal may add an expression label of a category of "expressions of friend-A" in the expression panel of the current user A, where the expression label may be displayed as an icon. For example, the icon of the category of "expressions of friend-A" displayed in FIG. 6 is a heart. The applicant, namely, the user A, may click the expression label of the category of "expressions of friend-A". In this case, in response to the click operation of the user A for the target contact expression label, the terminal displays authorized favorite expressions of the friend-A shown in FIG. 6 in the expression panel. Further, the user A may select a fifth "chicken expression" in a second row from the favorite expressions of the friend-A in the expression panel shown in FIG. 6. In this case, in response to an expression selection operation of the user A, the terminal transmits the expression image, namely, the "chicken expression", designated by the expression selection operation and favorited by the friend-A to the chat session. The "chicken expression" is displayed in chat content of the chat session participated by the current user A, and the "chicken expression" is an authorized favorite expression of the friend-A. In this way, a part or all of favorite expression content of the friend is supported to be applied to be invoked. In this way, in a chat scenario of users in a specific circle, emoticon content of other contacts can be quickly invoked to expand an expression library of the user, and more accurate expressions are quickly found to convey emotions, thereby effectively improving social interaction experience of communication, and effectively improving a communication effect.

In an embodiment, the method further includes: in a case that the expression sharing feedback indicating that the first expression sharing request is passed is received and synchronous updating of the expression image is authorized, synchronizing an updated expression image of the target contact to a storage area corresponding to a contact expression label.

Figure 9:
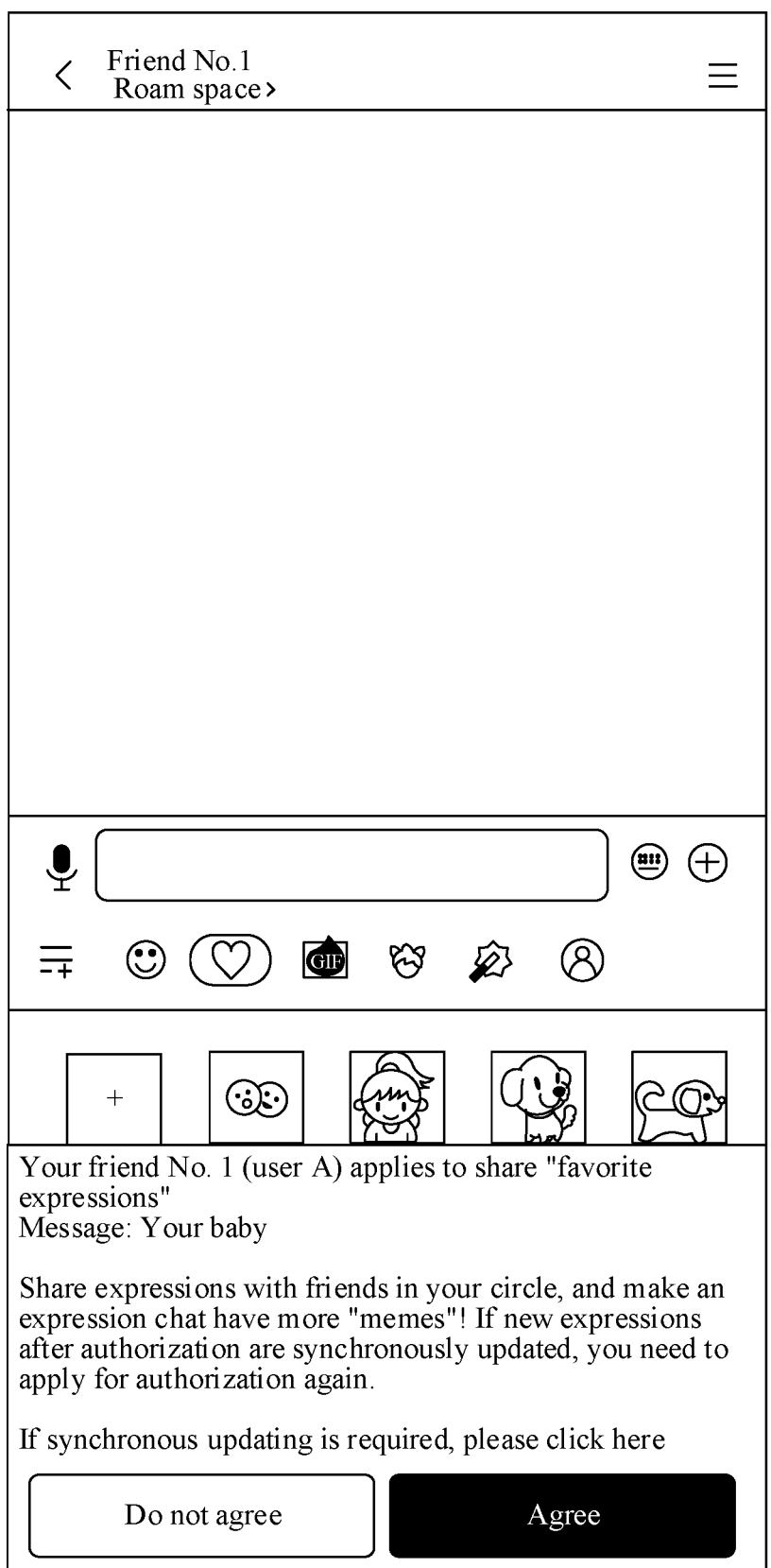
FIG. 9 is a schematic diagram of display of an interface when a respondent receives a permission application according to an embodiment.

Specifically, after the terminal initiates, in response to the expression sharing operation triggered by the user, the expression sharing request to the target contact corresponding to the target contact identifier, the target contact receives the expression sharing request transmitted by the user. For example, FIG. 9 is a schematic diagram of display of an interface when a respondent receives a permission application. It is assumed that the user A intends to apply for a sharing permission for expression images favorited by a friend-user B. In this case, after the terminal initiates, in response to an expression sharing operation triggered by the user A, an expression sharing request to the target contact, namely, the friend-user B, corresponding to the target contact identifier, the target contact, namely, the friend-user B, receives the expression sharing request triggered by the user A. FIG. 9 is a schematic diagram of display of an interface when a respondent, namely, the friend-user B, receives a permission application. A user identifier of an applicant initiating the expression sharing request is displayed in FIG. 9, in other words, "Your friend No.1 (user A) applies to share favorite expressions" is displayed in FIG. 9. In addition, a page displayed in FIG. 9 also provides a function for the user to customize selection. For example, for whether to authorize synchronous updating of favorite expressions, "If synchronous updating is required, please click here" is displayed in FIG. 9. In this case, when the respondent, namely, the friend-user B, receives the permission application, if the respondent, namely, the friend-user B, also intends to be authorized to update expressions synchronously, the friend-user B may click a control "If synchronous updating is required, please click here" displayed in FIG. 9, to trigger confirmation of authorization for synchronous updating of the expression images. When the respondent, namely, the friend-user B, agrees to authorization for the expression sharing request and authorize synchronous updating of the expression images, the terminal may synchronize the updated expression image of the target contact, namely, the friend-user B, to a storage area corresponding to a "friend-user B expression label" of the user A. In other words, if the respondent, namely, the user B, selects real-time updating, every time the friend-user B updates emoticons, the applicant, namely, the user A performs updating after re-pulling resources.

Figures 10, 11:
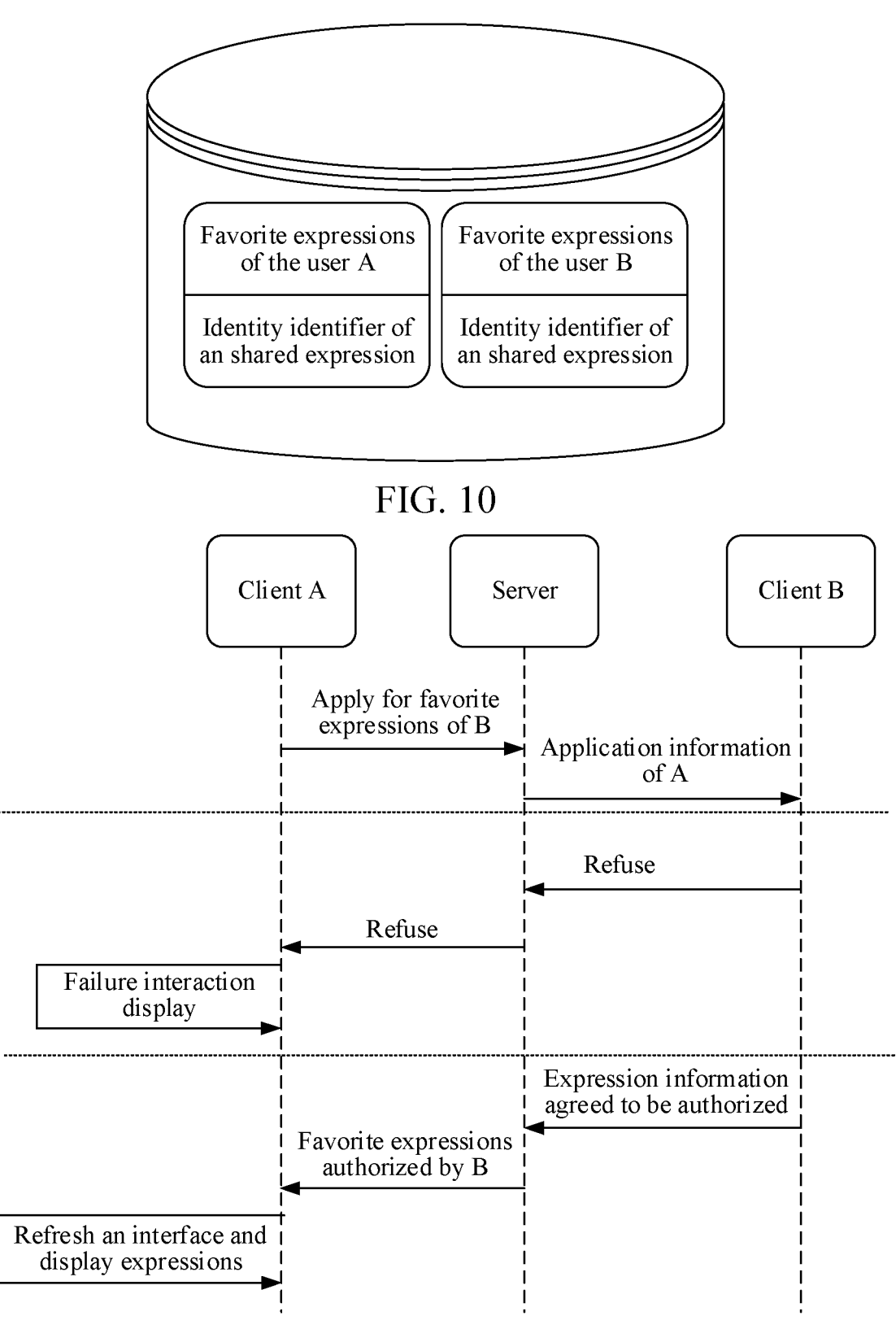
FIG. 10 is a schematic diagram of storing an identity identifier of a shared expression according to an embodiment.
FIG. 11 is a schematic flowchart of sharing and invoking an expression image according to an embodiment.

For example, FIG. 10 is a schematic diagram of storing an identity identifier of a shared expression. It is assumed that a terminal device used by the friend-user B is a terminal B, and a terminal device used by the user A is a terminal A. After the friend-user B receives the expression sharing request triggered by the user A, if the friend-user B selects to allow to perform real-time updating when agreeing to authorize, the terminal B is triggered to transmit an identity identifier of the user A to a server, and the server records the identity identifier of the user A in shared favorite expressions of the friend-user B. As shown in FIG. 10, the server may record the identity identifier of the user A in identity identifiers of shared expressions of the user B. Subsequently, when the friend-user B transmits such information related to updating authorized favorite expressions to the server, the server stores favorite expression information of the user B, and synchronously transmits favorite expression resources shared by the user B to all users with identity identifiers. The identity identifier of the user A has been recorded in the identity identifiers of the shared expressions of the user B. Therefore, the server also synchronously transmits the favorite expression resources shared by the user B to the user A with the identity identifier. In this way, after the terminal A receives the favorite expression resources shared by the user B that are synchronously transmitted by the server, the updated expression image of the friend-user B is synchronized to the storage area corresponding to the local "friend-user B expression label" of the user A. In this way, users in a same group are supported to apply for each other to invoke expression content, which can expand a reach path of such "circle expressions", accurately convey emotional interaction within a "circle", and improve social experience of transmission and receiving communication of expressions among people in a specific circle.

In an embodiment, the expression image corresponding to the target contact identifier is displayed in the expression panel in a thumbnail manner; and the transmitting, in response to the first expression selection operation, the expression image designated by the first expression selection operation includes: transmitting, in response to the first expression selection operation, an expression download request carrying the target contact identifier to a server; receiving an expression image returned by the server based on the target contact identifier; and transmitting the received expression image as a shared expression.

Specifically, FIG. 6 is a schematic diagram of display of an interface for adding a category of favorite expressions of a friend in an expression panel of an applicant. When the first expression sharing request transmitted by the user A to the "friend-A" is authorized, the terminal may add a category of "expressions of friend-A" in the expression panel of the current user A. The applicant, namely, the user A, may click an icon of the category of "expressions of friend-A", to display authorized favorite expression images of the friend-A shown in FIG. 6 in the expression panel. The authorized favorite expression images of the friend-A displayed in FIG. 6 may be displayed in the expression panel in the thumbnail manner. Because shared expression resources are all stored in a local server or a cloud server, downloading may be performed as required in a process of synchronizing favorite expressions, and only thumbnail resources of expressions may be downloaded when the current user A displays the expression panel.

Further, the user A may select the "chicken expression" in the favorite expressions of the friend-A in the expression panel shown in FIG. 6. In this case, in response to the expression selection operation of the user A, the terminal transmits the expression download request carrying the target contact identifier, namely, the identifier of the friend-A, to the server. When the terminal receives the expression image returned by the server based on the identifier of the friend-A, the terminal may transmit the received "chicken expression" as the shared expression. In other words, for the client or the terminal, when the user A triggers an expression panel exposure behavior, the terminal downloads thumbnails, animations, and original image resources of the favorite expressions together.

It may be understood, that the server in this embodiment of this disclosure may be a local server or a cloud server. When the server is a local server, after a cloud server receives authorization agree information of a friend, the cloud server may transmit, based on shared identification carried in an expression image, expression resources that the friend agrees to share to a client A after perform selection on expressions stored by the friend in the cloud server, so that the client A stores all expression image resources of the friend in the local server. When the user intends to transmit a specific shared favorite expression, all other resources related to the expression image are continued to be downloaded from the local server for display.

When the server is a cloud server, all expression image resources are stored in the cloud server. When the user intends to transmit a specific shared favorite expression, in response to the expression selection operation of the user A, the terminal needs to transmit the expression download request carrying the target contact identifier, namely, the identifier of the friend-A, to the cloud server, to continue to download all other resources related to the expression image from the cloud server for display.

In this embodiment, users in a same group are supported to apply for each other to invoke expression content, which can expand a reach path of such "circle expressions", accurately convey emotional interaction within a "circle", and improve social experience of transmission and receiving communication of expressions among people in a specific circle. In addition, the user is also supported to initiate a permission request to a corresponding friend when using an "emoticon sharing" function, to obtain relevant authorization for a part or all of the content and whether to perform real-time updating. In this way, when privacy, security, and compliance of an emoticon data resource invoking procedure are ensured.

In an embodiment, the displaying the expression image corresponding to the target contact identifier in the expression panel includes: in a case that the expression image corresponding to the target contact identifier includes a shared expression image and a non-shared expression image that are configured, displaying the shared expression image in the expression panel.

The configured shared expression image is an expression preset by the user and allowed to be shared. For example, the respondent may set which expressions are favorite expressions allowed to be shared on the favorite expression management page.

The configured non-shared expression image is an expression preset by the user and not allowed to be shared. For example, the respondent may set which expressions are favorite expressions not allowed to be shared on the favorite expression management page. When a friend initiates an expression sharing application, even if the respondent selects to agree, such expressions are not synchronized to an expression panel of the friend.

Specifically, after the terminal initiates, in response to the expression sharing operation triggered by the user, the first expression sharing request to the target contact corresponding to the target contact identifier, when the first expression sharing request is authorized by the target contact, the terminal may add a label of a category of "expressions of the target contact" in the expression panel of the current user, namely, the applicant, and display the added target contact expression label in the expression panel of the session page. The user may click the label of the category of "expressions of the target contact", and select expressions favorited by the target contact for transmission. In other words, in response to a click operation of the user for the target contact expression label, the terminal displays expression images corresponding to the target contact identifier under the label in the expression panel. If the expression image corresponding to the target contact identifier includes the shared expression image and the non-shared expression image that are pre-configured by the user, in response to the click operation of the user for the target contact expression label, the terminal displays the shared expression image corresponding to the target contact identifier under the label in the expression panel. In other words, an expression image displayed by the terminal in the expression panel is a shared expression image set by the user.

For example, FIG. 6 is a schematic diagram of display of an interface for adding a category of favorite expressions of a friend in an expression panel of an applicant. When the expression sharing request transmitted by the user A to the "friend-A" is authorized by the "friend-A", the terminal may add an expression label of a category of "expressions of friend-A" in the expression panel of the current user A, where the expression label may be displayed as an icon. For example, the icon of the category of "expressions of friend- A" displayed in FIG. 6 is a heart. The applicant, namely, the user A, may click the expression label of the category of "expressions of friend-A". In this case, in response to the click operation of the user A for the target contact expression label, the terminal displays a shared expression image pre- configured by the friend-A under the label shown in FIG. 6 in the expression panel. In other words, an expression image displayed by the terminal shown in FIG. 6 in the expression panel is the shared expression image set by the user. For example, a fifth "chicken expression" in a second row of the expression panel shown in FIG. 6 is a favorite expression set by the friend-A and allowed to be shared on the favorite expression management page. In this way, the user is also supported to initiate a permission request to a corresponding friend when using an "emoticon sharing" function, to obtain relevant authorization for a part or all of the content and whether to perform real-time updating. In this way, when privacy, security, and compliance of an emoticon data resource invoking procedure are ensured.

In an embodiment, the method further includes: selecting, in a case that a second expression sharing request initiated by another contact is received, a to-be-shared expression image from local expression images; marking the to-be-shared expression image, to obtain shared identification information; and transmitting the shared identification infor- mation to a server, to indicate the server to transmit the expression image corresponding to the shared identification information to the another contact.

The second expression sharing request is an expression sharing request initiated by another user to the current user. For example, if the current user A is a respondent, the friend B is an applicant, and the friend B intends to apply for an authorization permission for expressions favorited by the user A, the friend B may trigger to transmit an expression sharing request to the user A. The expression sharing request may be referred to as the second expression sharing request to distinguish it from the first expression sharing request.

The first expression sharing request is an expression sharing request initiated by the current user to another user. For example, if the current user A is an applicant, the friend B is a respondent, and the user A intends to apply for an authorization permission for expressions favorited by the friend B, the user A may trigger to transmit an expression sharing request to the friend B. The expression sharing request may be referred to as the first expression sharing request.

Specifically, when the terminal receives the second expression sharing request initiated by the another contact, in response to an authorization operation triggered by the user, the terminal selects the to-be-shared expression image from the local expression images, and marks the to-be- shared expression image, to obtain the shared identification information. Further, the terminal may transmit the shared identification information to the server, to indicate the server to transmit the expression image corresponding to the shared identification information to the another contact.

For example, FIG. 11 is a schematic flowchart of sharing and invoking an expression image. A client A transmits a message about an expression sharing application to a client B through a server. After the client B receives the applica- tion, if a user selects to refuse, response information indi- cating that the application failed is transmitted to the client A. After the client A receives the information indicating that the application failed, corresponding copy and interaction are displayed. If the user agrees to authorize, in response to an authorization agree operation triggered by the user, the terminal may first select favorite expressions that can be shared, record and store shared identification information of the selected emoticons, and transmit the authorization agree information together with the shared identification informa- tion to a server end. After the server end receives authori- zation agree information of B, after selection is performed on expressions stored by B in the server through a shared identifier, selected expressions are transmitted to the client A. After expression information resources are received, the client A refreshes an interface, and displays corresponding shared expressions. In this way, a part or all of favorite expression content of the friend is supported to be applied to be invoked. In this way, in a chat scenario of users in a specific circle, emoticon content of other contacts can be quickly invoked to expand an expression library of the user, and more accurate expressions are quickly found to convey emotions, thereby effectively improving social interaction experience of communication, and effectively improving a communication effect.

In an embodiment, the method further includes: display- ing a prompt page after receiving the second expression sharing request initiated by the another contact; reading message text of the another contact from the second expres- sion sharing request; and displaying the message text and corresponding shared prompt information on the prompt page.

The prompt page is a page for prompting that an expres- sion sharing request initiated by another contact is received. The prompt page in this application may be a floating layer page.

Specifically, after the terminal receives the second expres- sion sharing request initiated by the another contact, the terminal may display the prompt page on the session page opened by the current user, where the prompt page may be a floating layer page invoked by the terminal on the current session page, or may be a prompt pop-up window invoked by the terminal on the current session page. Further, the terminal may read the message text of the another contact from the second expression sharing request, and display the message text and the corresponding shared prompt informa- tion on the prompt page. The message text may be text with a specific meaning edited by the applicant. For example, content in the message text may be a secret code between close friends, so that the respondent can quickly agree to authorize the expression sharing request. The shared prompt information may include prompt information indicating whether to perform synchronous updating.

For example, FIG. 9 is a schematic diagram of display of an interface when a respondent receives a permission appli- cation. It is assumed that a friend-user B intends to apply for a sharing permission for expression images favorited by the user A. In this case, after the terminal initiates, in response to an expression sharing operation triggered by the friend- user B, an expression sharing request to the target contact, namely, the user A, corresponding to the target contact identifier, the user A receives the expression sharing request triggered by the friend-user B. FIG. 9 is a schematic diagram of display of a prompt page when a respondent, namely, the user A, receives a permission application. A user identifier of an applicant initiating the expression sharing request is displayed on the prompt page shown in FIG. 9, in other words, shared prompt information displayed on the prompt page shown in FIG. 9 includes: "Your friend No.1 (user B) applies to share favorite expressions". Message text dis- played on the prompt page shown in FIG. 9 is your baby, so that after the respondent, namely, the user A, views the message, the user A quickly agrees to authorization for the expression sharing request, or authorizes synchronous updating of the expression images. In addition, the shared prompt information displayed on the prompt page shown in FIG. 9 further includes: "If synchronous updating is required, please click here". When the respondent, namely, the user A, agrees to authorization for the expression sharing request and authorizes synchronous updating of the expression images, the terminal may synchronize an updated expression image of the user A to a storage area corresponding to a "friend-user A expression label" of the friend-user B. In other words, if the respondent, namely, the user A, selects real-time updating, every time the user A updates emoticons, the applicant, namely, the friend-user B performs updating after re-pulling resources. In this way, a part or all of favorite expression content of the friend is supported to be applied to be invoked. In this way, in a chat scenario of users in a specific circle, emoticon content of other contacts can be quickly invoked to expand an expression library of the user, and more accurate expressions are quickly found to convey emotions, thereby effectively improving social interaction experience of communication, and effectively improving a communication effect.

In an embodiment, the session page is a page for information interaction in a first application program; and the method further includes: uploading a local expression image to a server through the first application program In an embodiment, the method further includes transmitting a first download request to the server when a log-in device of the first application program changes, and receiving an expression image returned by the server; or transmitting a second download request to the server when a log-in account of the first application program changes, and receiving an expression image returned by the server and corresponding to a changed log-in account.

Specifically, the terminal may upload the local expression image to the server through the first application program; and when the log-in device of the detect first application program changes, the terminal may transmit the first download request to the server, and receives the expression image returned by the server; or when the log-in account of the first application program changes, the terminal may transmit the second download request to the server, and receives the expression image returned by the server and corresponding to the changed log-in account. In a process of favoriting expressions, local expression resources of a client need to be first uploaded to a local server or a cloud server. When uploading, thumbnail resources, animation resources, and original image resources related to the expressions need to be simultaneously transmitted. In this way, when an account or a device is switched, favorite expression resources in the account are transmitted to the client through the local server or the cloud server. When a user triggers an expression panel exposure behavior, the client downloads thumbnails, animations, and original image resources of the favorite expressions. Because shared expression resources are all stored in a local server end or the cloud server, downloading may be performed as required in a process of synchronizing favorite expressions of a friend. When the expression panel is displayed, only thumbnail resources of the expressions can be downloaded; and when the user transmits a specific shared favorite expression, all other related resources are continued to be downloaded for display. The advantage of this is as follows: First, a quantity and an overall size of downloaded expression resources are reduced, and encoding and decoding steps of the resources are streamlined, making an app run more smoothly. Second, traffic costs of transmitting emoticon resources between a server end and a client are also saved.

In an embodiment, this disclosure further provides an application scenario, and the foregoing method for sharing an expression image is applied to the application scenario. Specifically, application of the method for sharing an expression image in the application scenario is as follows:

When a user intends to invoke an expression favorited by a friend, the foregoing method for sharing an expression image may be used. To be specific, after the user logs in a communication application, the user may trigger an expression application operation on a session page. After a terminal displays candidate contact identifiers in response to the expression application operation triggered by the user on the session page, the user may select a target friend identifier from the displayed candidate contact identifiers. In this way, in response to a selection operation of the user, the terminal displays an expression corresponding to the friend identifier designated by the selection operation. Further, in response to an expression sharing operation triggered by the user, the terminal initiates an expression sharing request to a friend corresponding to the target friend identifier. When the expression sharing request is authorized by the friend and there is one shared expression requested by the expression sharing request to authorize, the terminal may transmit the shared expression to a chat session. Alternatively, when the expression sharing request is authorized and there are at least two shared expressions requested by the expression sharing request to authorize, the terminal may add a category of an expression label corresponding to the target friend identifier in an expression panel of the session page. In response to a trigger operation for a friend expression label, the terminal displays favorite expressions allowed by the friend to share, so that the user can select an expression needed by the user. In other words, in response to an expression selection operation of the user, the terminal transmits an expression designated by the expression selection operation and favorited by the friend. A back-end server of the communication application may be implemented by using an independent server or a server cluster formed by a plurality of servers.

The method provided in the embodiments of this disclosure may be applied to a scenario in various social software uses emoticons. The following describes the method for sharing an expression image provided in the embodiments of this disclosure by using a scenario in which expression message are used to communicate in social software as an example.

In social software in the industry, users are allowed to save chat expressions by themselves in a chat scenario, or select or download mall expressions in an expression panel, which belongs to an expression transmission capability provided by a social software platform. In a conventional manner, an expression library of a user may be expanded by optimizing creative ecology of expression malls, continuously and actively favoriting an expression in a chat scenario, and performing search across the entire network. However, in a specific communication scenario and friend relationship, the expressions provided by the foregoing sources are relatively generic in design. As a result, "circle memes" for specific group communication are lacked, making it impossible to accurately convey implicit emotions in communication. In addition, because eligible expressions often exist in group chats or are created by users, such expressions are difficult to be labeled universally and are not eligible to be put on mall expressions. In addition, because there is no channel for such expressions in group chat messages to accumulate, it is difficult to reach and discover through conventional expression search channels. Especially, in a specific communication scenario and friend relationship, the expressions provided by the foregoing sources are relatively generic in design. As a result, it is difficult to obtain expressions that meet the user's needs, thus easily affecting effectiveness of communication.

Therefore, to resolve the foregoing problems, this disclosure provides a method for sharing and invoking an expression message in social software. That is, the solution provided in this disclosure can solve such problems to a certain extent. Transmission and receiving of such emoticons including "circle memes" are often limited to specific circles, so that expressions favorited or created by people in a same circle through various channels are most likely be transmitted to single chats and group chats with internal circles. Therefore, if users in a same group are supported to apply for each other to invoke emoticon content, a reach path of such "circle expressions" can be expanded, emotional interaction within a "circle" can be accurately conveyed, and social experience of transmission and receiving communication of expressions among people in a specific circle can be improved. In this way, expressions that meet the user's needs can be quickly and accurately obtained, thereby effectively improving the communication effect.

The solution provided in this disclosure supports an application for invoking a part or all of favorite expression content of a friend in a scenario of social software expression message communication. In this way, when a user in a specific circle cannot find a "most accurate" expression to convey emotions in a chat scenario, an "emoticon sharing" solution is pioneered in the industry, to enhance social interaction experience of "circle" communication.

In addition, in the solution provided in this disclosure, the user is also supported to initiate a permission request to a corresponding friend when using an "emoticon sharing" function, to obtain relevant authorization for a part or all of the content and whether to perform real-time updating. In this way, when privacy, security, and compliance of an emoticon data resource invoking procedure are ensured.

Finally, in the solution provided in this disclosure, after friend authorization is completed, "shared emoticons" are displayed locally in a thumbnail manner. During use and transmission, the user initiates a download request to a corresponding local server or cloud server. In this way, even if emoticon content is quickly invoked and the expression library of the user is expanded, storage pressure of pulling local expression resources can be greatly reduced.

All In One (AIO) is, for example, a public chat window component. In a mobile version of social software, a user participates in many different types of sessions such as friends, groups, and public accounts. To provide the user with unified interactive experience, the software provides a chat window component for sharing in different sessions. An input, a click operation, and other behavioral habits of the user in the component can be regarded as consistent.

Circle is, for example, a generalization of relatively mid-to-high-end specific social groups that naturally arise in a stratified social context. It can be a class with a same social attribute in a broad sense, or can be a group with strong social ties and similar social attributes in a region.

Meme is, for example, Internet slang, such as "gen", which represents a joke, a foreshadowing, or something with a special referential or ironic connotation.

Emoticon is, for example, a manner of expressing emotions through a picture. Emoticons are a popular culture formed after the social software became active. The emoticons are popular on the Internet, and basically every person posts emoticons. In the era of mobile Internet, people use popular celebrities, quotations, animations, and film and television screenshots as materials, and add a series of matching text, to express specific emotions. The emoticon is an example of the emotive image.

Figures 12, 13:
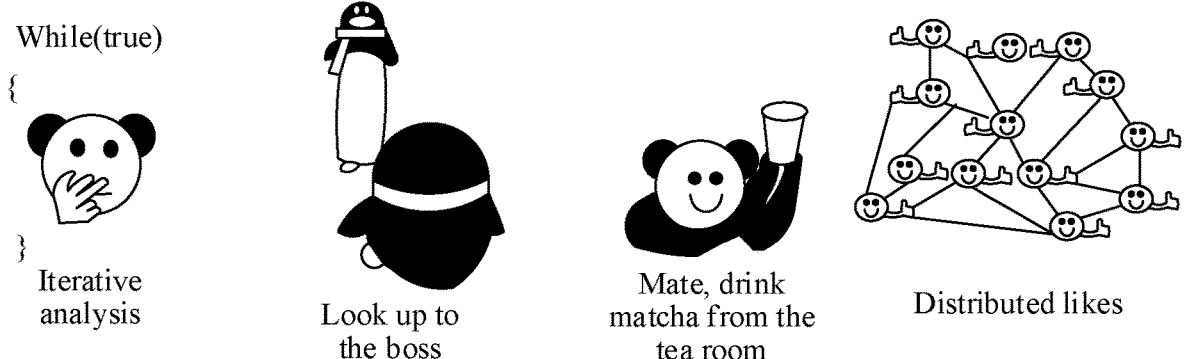
FIG. 12 is a schematic diagram of "circle expressions" according to an embodiment.
FIG. 13 is an overall architecture diagram of sharing and invoking an expression image according to an embodiment.

FIG. 12 is a schematic diagram of "circle expressions". Specific "circle expressions" may be expressions shown in FIG. 12. The circle expressions may point to a specific type of user group. For example, the "circle expressions" shown in FIG. 12 may point to a user group such as "programmers". It may be understood that, the "circle expressions" in this disclosure may be obtained from secondary creations based on pictures or cartoon templates, or customized creations.

On a product side, FIG. 3 to FIG. 9 may all be used as schematic diagrams of interfaces of the product side in the solution provided in this disclosure.

1. A user chats in AIO in social software, and clicks a "+" entry for favorite expressions in an expression panel. AIO scenarios herein include but are not limited to a single chat, a group chat, and the like. As long as a current communication interface can invoke the expression panel, an "expression sharing" capability can be supported.

2. Invoke an emoticon application floating layer, so that a specific friend can be selected from a friend list to initiate an "emoticon sharing" application.

An applicant A may select, on a floating layer page, a friend that the applicant A hopes to apply for emoticons of the friend, and may select a part or all of expressions that the applicant A hopes to apply for on a preview page of a secondary confirmation pop-up window. When the user clicks on the preview page, the user enters an expression management selection page. The user may select all, with one click, or select a part of expression content that the user hopes to apply for. After selection is completed, a respondent can only receive an application for an expression that the user hopes to obtain authorization.

A respondent B may select to agree or refuse, may select to share a part or all of emoticons, and may select whether to perform real-time updating. If the respondent B selects real-time updating, every time B updates emoticons, the applicant A performs updating after re-pulling resources.

3. If the "emoticon sharing" application is passed, the applicant A may add a category of "expressions of B" to an expression panel of the applicant A. The applicant A may click on the category of "expressions of B", and select a favorite expression of B for normal transmission.

The respondent may select whether to synchronize favorite expressions in real time. If there is only synchronization once, the applicant needs to initiate an application again subsequently, and same historical favorite expressions that have been synchronized are automatically deoverlapped and displayed.

The respondent may set a favorite expression that is not allowed to be shared on a favorite expression management page. When a friend initiates an expression sharing application, even if the respondent selects to agree, such expressions are not synchronized to an expression panel of the friend.

The user may select to apply to share favorite expressions of a plurality of friends. Favorite expressions of each friend are displayed in the expression panel through an independent tab, similar to addition display logic of an expression mall.

On a technical side, FIG. 13 is an overall architecture diagram of sharing and invoking an expression image.

1. Overall Architecture

In the overall architecture diagram shown in FIG. 13, an expression sharing function described in the embodiments of this disclosure requires interaction between a client and a server end. The client represents a device used by a user, and the server end represents a device that manages resources and provides services for the client.

Favorite expressions of the user are all stored in the server end. As long as the client applies for favorite expressions thereof from the server and carries identity information of the user, the server end can transmit corresponding expression resources to the client. Therefore, when the client carries identity information of another user when applying for favorite expression resources from the server end, favorite expression resources of the another user can be obtained.

However, the foregoing steps can usually only obtain a full amount of favorite expression resources. If a resource of a designated expression is intended to be shared, FIG. 14 is a schematic diagram of information for expanding a favorite expression. In other words, an identifier for identifying whether an expression belongs to a shared expression, for example, a shared identifier, may be added in an expansion field. In the solution provided in this disclosure, information of the favorite expressions needs to be expanded, to identify whether the favorite expressions of the user support sharing.

2. Exemplary Procedure

FIG. 11 is a schematic flowchart of sharing and invoking an expression image. First, a client A transmits a message about an expression sharing application to a client B through a server. After the client B receives the application, if a user selects to refuse, response information indicating that the application failed is transmitted to the client A. After the client A receives the information indicating that the application failed, corresponding copy and interaction are displayed. If the user agrees to authorize, favorite expressions that can be shared may be first selected, shared identification information of the selected emoticons are recorded and stored, and the authorization agree information together with the shared identification information are transmitted to a server end. After the server end receives authorization agree information of B, after selection is performed on expressions stored by B in the server through a shared identifier, selected expressions are transmitted to the client A. After expression information resources are received, the client A refreshes an interface, and displays corresponding shared expressions.

FIG. 10 is a schematic diagram of storing an identity identifier of a shared expression. If a user B selects to allow to perform real-time updating when agreeing to authorize, an identity identifier of a user A is transmitted to a server end, and the server records the identity identifier of A in shared favorite expressions of the user B, as shown in the figure. Subsequently, when the user B transmits such information related to updating authorized favorite expressions to the server, the server end stores favorite expression information of the user B, and synchronously transmits favorite expression resources shared by the user B to all users with identity identifiers.

In a process of favoriting expressions, local expression resources of a client need to be first uploaded to a local server or a cloud server. When uploading, thumbnail resources, animation resources, and original image resources related to the expressions need to be simultaneously transmitted. In this way, when an account or a device is switched, favorite expression resources in the account are transmitted to the client through the local server or the cloud server. When a user triggers an expression panel exposure behavior, the client downloads thumbnails, animations, and original image resources of the favorite expressions.

Because shared expression resources are all stored in a local server end or a cloud server end, downloading may be performed as required in a process of synchronizing favorite expressions. When an expression panel is displayed on an expression preview subpage, only thumbnail resources of the expressions can be downloaded; and when a specific shared favorite expression is transmitted, all other related resources are continued to be downloaded for display. The advantage of this is as follows: First, a quantity and an overall size of downloaded expression resources are reduced, and encoding and decoding steps of the resources are streamlined, making an app run more smoothly. Second, traffic costs of transmitting emoticon resources between a server end and a client are also saved.

Beneficial effects brought by the technical solutions provided in this disclosure include the following.

On a basis of optimizing a local storage space, this disclosure provides an "expression sharing" manner to quickly invoke a new expression category, which resolves the user's needs for specific circle expressions to a certain extent, and improves online social experience of transmission and receiving communication of expressions among people in a specific circle.

It may be understood that, the embodiments of this disclosure focus on a manner of sharing and invoking a favorite expression in a single chat scenario. In a group chat scenario, the method provided in this disclosure can also be used to accumulate expressions in a group with one click as a new expression category for sharing.

Although steps in the flowcharts involved in the foregoing embodiments are displayed sequentially according to instructions of arrows, these steps are not necessarily performed sequentially according to a sequence instructed by the arrows. Unless otherwise explicitly specified in this specification, execution of the steps is not strictly limited, and the steps may be performed in other sequences. In addition, at least some steps in the flowcharts involved in the foregoing embodiments may include a plurality of steps or a plurality of stages, and these steps or stages are not necessarily performed at a same time instant, but may be performed at different time instants. The steps or stages are not necessarily performed in sequence, but may be performed by turn or alternately with other steps or at least part of steps or stages in other steps.

Based on the same inventive concept, an embodiment of this disclosure further provides an apparatus for sharing an expression image configured to implement the foregoing method for sharing an expression image. The solution to the problem provided by the apparatus is similar to the solution described in the foregoing method. Therefore, for specific limitations in one or more embodiments of the apparatus for sharing an expression image provided below, refer to the limitations on the foregoing method for sharing an expression image. Details are not repeated herein again.

In an embodiment, as shown in FIG. 15, an apparatus for sharing an expression image is provided, and includes a display module 1502, a transmission module 1504, and an initiation module 1506.

The display module 1502 is configured to display candidate contact identifiers in response to an expression application operation triggered on a session page; and display, in response to a first contact selection operation, an expression image corresponding to a target contact identifier designated by the first contact selection operation, the target contact identifier belonging to the candidate contact identifiers.

The initiation module 1504 is configured to initiate, in response to an expression sharing operation, a first expression sharing request to a target contact corresponding to the target contact identifier.

The transmission module 1506 is configured to transmit, in response to a first expression selection operation in a case that an expression sharing feedback indicating that the first expression sharing request is passed is received, an expression image designated by the first expression selection operation, the designated expression image being the expression image corresponding to the target contact identifier.

In an embodiment, the display module is further configured to display, in response to an expression management operation triggered on the session page, a favorite expression image of an operation object triggering the expression management operation; and use, in response to an expression sharing operation, a favorite expression image designated by the expression sharing operation as an expression image shared by the operation object with a contact.

In an embodiment, the display module is further configured to display an expression application subpage in response to the expression application operation triggered in an expression panel of the session page; and display the candidate contact identifiers on the expression application subpage.

In an embodiment, the display module is further configured to display a contact list control on the expression application subpage; display, in a case that the candidate contact identifiers do not include the target contact identifier, a contact list designated by the contact list control in response to a trigger operation for the contact list control; and display, in response to a second contact selection operation, an expression image corresponding to a target contact identifier designated by the second contact selection operation.

In an embodiment, the apparatus further includes: a determining module, configured to determine quantities of times of interaction between an operation object and global contacts; and determine display priorities of the global contacts according to the quantities of times of interaction; and a selection module, configured to select, in contact identifiers corresponding to the global contacts, contact identifiers of a preset quantity according to the display priorities, and use the selected contact identifiers as the local contact identifiers; and the display module is further configured to display the local contact identifiers on the expression application subpage.

In an embodiment, the display module is further configured to display, in response to the first contact selection operation, an expression preview subpage on the session page; and display, on the expression preview subpage, the expression image corresponding to the target contact identifier designated by the first contact selection operation.

In an embodiment, the display module is further configured to display edited message text in response to an editing operation triggered on the message control; and the initiation module is further configured to initiate, in response to the expression sharing operation, the first expression sharing request carrying the message text to the target contact corresponding to the target contact identifier.

In an embodiment, the display module is further configured to display, on the expression preview subpage in a thumbnail manner, the expression image corresponding to the target contact identifier designated by the first contact selection operation; or the determining module is further configured to determine display priorities of expression images according to use frequencies of the expression images, and the display module is further configured to display, according to the display priorities, expression images of a preset quantity corresponding to the target contact identifier on the expression preview subpage.

In an embodiment, the apparatus further includes a setting module. The display module is further configured to display an expression management page in response to an expression management operation triggered on the expression preview subpage, where the expression management page includes the expression image corresponding to the target contact identifier; and the setting module is configured to set, in response to a second expression selection operation, an expression image designated by the second expression selection operation as a selected state; and the initiation module is further configured to initiate, in response to the expression sharing operation, the first expression sharing request for the expression image in the selected state to the target contact corresponding to the target contact identifier.

In an embodiment, the display module is further configured to display, in a case that the expression sharing feedback indicating that the first expression sharing request is passed is received, a target contact expression label in an expression panel of the session page; and display, in response to a trigger operation for the target contact expression label, the expression image corresponding to the target contact identifier in the expression panel; and the transmission module is further configured to transmit, in response to the first expression selection operation, the expression image designated by the first expression selection operation.

In an embodiment, the apparatus further includes: a synchronization module, configured to synchronize, in a case that the expression sharing feedback indicating that the first expression sharing request is passed is received and synchronous updating of the expression image is authorized, an updated expression image of the target contact to a storage area corresponding to a contact expression label.

In an embodiment, the apparatus further includes: a receiving module. The transmission module is further configured to transmit, in response to the first expression selection operation, an expression download request carrying the target contact identifier to a server; the receiving module is configured to receive an expression image returned by the server based on the target contact identifier; and the transmission module is further configured to transmit the received expression image as a shared expression.

In an embodiment, the display module is further configured to display, in a case that the expression image corresponding to the target contact identifier includes a shared expression image and a non-shared expression image that are configured, the shared expression image in the expression panel.

In an embodiment, the apparatus further includes: a selection module, configured to select, in a case that a second expression sharing request initiated by another contact is received, a to-be-shared expression image from local expression images; and a marking module, configured to mark the to-be-shared expression image, to obtain shared identification information; and the transmission module is further configured to transmit the shared identification information to a server, to indicate the server to transmit the expression image corresponding to the shared identification information to the another contact.

In an embodiment, the apparatus further includes: a reading module. The display module is further configured to display a prompt page after receiving the second expression sharing request initiated by the another contact; the reading module is configured to read message text of the another contact from the second expression sharing request; and the display module is further configured to display the message text and corresponding shared prompt information on the prompt page.

The modules in the apparatus for sharing an expression image may be implemented entirely or partially by software, hardware, or combinations thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a terminal, and an internal structure diagram thereof may be shown in FIG. 16. The computer device includes a processor, a memory, an input/output interface, a communication interface, a display unit, and an input apparatus. The processor, the memory, and the input/output interface are connected via a system bus, and the communication interface, the display unit, and the input apparatus are connected to the system bus via the input/output interface. The processor of the computer device is configured to provide computing and control capabilities. The memory of the computer device includes a non-volatile storage medium and an internal memory. The non-volatile storage medium stores an operating system and a computer-readable instruction. The internal memory provides an environment for running of the operating system and the computer-readable instruction in the non-volatile storage medium. The input/output interface of the computer device is configured to exchange information between the processor and an external device. The communication interface of the computer device is configured to communicate with an external terminal in a wired or wireless manner, and the wireless manner may be implemented through WIFI, a mobile cellular network, near field communication (NFC), or other technologies. The computer-readable instruction is executed by the processor to implement a method for sharing an expression image. The display unit of the computer device is configured to form a visually visible picture, and may be a display screen, a projection apparatus, or a virtual reality imaging apparatus. The display screen may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

A person skilled in the art may understand that, the structure shown in FIG. 16 is only a block diagram of a part of a structure related to a solution of this disclosure and does not limit the computer device to which the solution of this disclosure is applied. Specifically, the computer device may include more or fewer components than those in the drawings, or some components are combined, or a different component deployment is used.

In an embodiment, a computer device is provided, including a memory and a processor, the memory storing computer-readable instructions, the processor, when executing the computer-readable instructions, implementing the steps in the foregoing method embodiments.

In an embodiment, a computer-readable storage medium is provided, storing computer-readable instructions, the computer-readable instructions, when executed by a processor, implementing the steps in the foregoing method embodiments. In an example, the computer-readable storage medium is a non-transitory computer-readable storage medium.

In an embodiment, a computer program product or computer-readable instructions are provided, the computer program product or the computer-readable instructions including computer instructions, and the computer instructions being stored in a computer-readable storage medium. A processor of a computer device reads the computer instructions from the computer-readable storage medium, and the processor executes the computer instructions, to cause the computer device to perform the steps in the foregoing method embodiments.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a database, or another medium used in the embodiments provided in this disclosure may include at least one of a non-volatile memory and a volatile memory. The non-volatile memory may include a read-only memory (ROM), a magnetic tape, a floppy disk, a flash memory, an optical memory, a high-density embedded non-volatile memory, a resistive memory (ReRAM), a magnetoresistive random access memory (MRAM), a ferroelectric random access memory (FRAM), a phase change memory (PCM), a graphene memory, or the like. The volatile memory may include a random access memory (RAM), an external cache, or the like. For the purpose of description instead of limitation, the RAM is available in a plurality of forms, such as a static RAM (SRAM) or a dynamic RAM (DRAM). The database involved in the embodiments provided in this disclosure may include at least one of a relational database and a non-relational database. The non-relational database may include a blockchain-based distributed database, or the like, but is not limited thereto. The processor involved in the embodiments provided in this disclosure may be a general-purpose processor, a central processing unit, a graphics processor, digital signal processor, a programmable logic device, a quantum computing-based data processing logic device, or the like, but is not limited thereto.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

Technical features of the foregoing embodiments may be combined in various manners. To make description concise, not all possible combinations of the technical features in the foregoing embodiments are described. However, the combinations of these technical features shall be considered as falling within the scope recorded by this specification provided that no conflict exists.

The foregoing embodiments only show several implementations of this disclosure, and descriptions thereof are in detail, but are not to be understood as a limitation to the patent scope of this disclosure. A person of ordinary skill in the art may further make several variations and improvements without departing from the ideas of this disclosure, and such variations and improvements all fall within the protection scope of this disclosure.

What is claimed is:

1. A method for acquiring a shared emotive image, the method comprising:
   displaying a plurality of candidate contact identifiers in response to an emotive image application operation triggered by a user;
   receiving a user selection of a target contact identifier from the plurality of candidate contact identifiers;
   displaying at least one emotive image corresponding to the target contact identifier, the at least one emotive image being shared by a target contact of the target contact identifier;
   receiving a user selection of the shared emotive image from the at least one emotive image corresponding to the target contact identifier;
   sending an emotive image acquisition request to the target contact corresponding to the target contact identifier, the emotive image acquisition request identifying the shared emotive image for which authorization is requested; and
   adding the shared emotive image to an emotive image library based on the authorization to use the shared emotive image being received.

2. The method according to claim 1, further comprising:
   displaying, in response to an emotive image management operation triggered by the user, a favorite emotive image of the user; and
   setting, in response to an emotive image sharing operation being performed on the favorite emotive image, the favorite emotive image as a shareable emotive image of the user.

3. The method according to claim 1, wherein the displaying the plurality of candidate contact identifiers comprises:
   displaying an emotive image application subpage in response to the emotive image application operation; and
   displaying the plurality of candidate contact identifiers on the emotive image application subpage.

4. The method according to claim 3, further comprising:
   displaying a contact list control element on the emotive image application subpage; and
   displaying, when the plurality of candidate contact identifiers do not include the target contact identifier, a contact list associated with the contact list control element in response to a user selection of the contact list control element.

5. The method according to claim 4, wherein
   the contact list control element is linked to a contact list of a first application program, a contact list of a subapplication, or a contact list of a second application program, and
   the subapplication is an application program running in a system environment provided by the first application program.

6. The method according to claim 3, wherein
   the plurality of candidate contact identifiers includes local contact identifiers of a preset quantity; and
   the displaying the candidate contact identifiers on the emotive image application subpage comprises:
   determining quantities of times of interaction between the user and global contacts;
   determining display priorities of the global contacts according to the quantities of times of interaction;
   selecting a preset quantity of the contact identifiers corresponding to the global contacts according to the display priorities;
   setting the selected contact identifiers as the local contact identifiers; and
   displaying the local contact identifiers on the emotive image application subpage.

7. The method according to claim 1, wherein the displaying the at least one emotive image comprises:
   displaying, in response to the user selection of the target contact identifier, an emotive image preview subpage; and
   displaying, on the emotive image preview subpage, the at least one emotive image corresponding to the target contact identifier.

8. The method according to claim 7, wherein
   the emotive image preview subpage includes a message control element; and
   the sending the emotive image acquisition requestion comprises:
   displaying edited message text in response to an editing operation triggered on the message control element; and
   sending the emotive image acquisition request including the message text to the target contact corresponding to the target contact identifier.

9. The method according to claim 7, wherein the displaying, on the emotive image preview subpage, the emotive image comprises:
   displaying, on the emotive preview subpage, a thumbnail of each of the at least one emotive image corresponding to the target contact identifier.

10. The method according to claim 1, wherein
   the at least one emotive image corresponding to the target contact identifier is displayed on an emotive image preview subpage;
   the method further comprises:
   displaying an emotive image management page in response to an emotive image management operation triggered on the emotive image preview subpage, the emotive image management page including the shared emotive image corresponding to the target contact identifier, and
   setting, in response to the user selection of the shared emotive image, the shared emotive image in a selected state; and
   the sending the emotive image acquisition request includes sending the emotive image acquisition request for the shared emotive image in the selected state to the target contact corresponding to the target contact identifier.

11. The method according to claim 1, further comprising:

displaying, when the authorization to use the emotive image is received from the target contact, a target contact label in an emotive image interface; and displaying, in response to a user selection of the target contact label, the shared emotive image corresponding to the target contact identifier in the emotive image interface.

12. The method according to claim 11, further comprising:

when the authorization to use the emotive image is received and synchronous updating of the emotive image is authorized, synchronizing an updated emotive image of the target contact.

13. The method according to claim 11, wherein a thumbnail of the shared emotive image corresponding to the target contact identifier is displayed in the emotive image interface; and the method further comprises:

transmitting an emotive image download request that includes the target contact identifier to a server after the authorization to use the emotive image is received, and receiving the shared emotive image from the server.

14. The method according to claim 11, wherein when the at least one emotive image corresponding to the target contact identifier includes the shared emotive image and a non-shared emotive image, the non-shared emotive image is not displayed in the emotive image interface.

15. The method according to claim 1, further comprising:

selecting, when an emotive image sharing request is received from another contact, a to-be-shared emotive image from local emotive images;

marking the to-be-shared emotive image, to obtain shared identification information; and transmitting the shared identification information to a server, to instruct the server to transmit the to-be-shared emotive image corresponding to the shared identification information to the another contact.

16. The method according to claim 15, further comprising:

displaying a prompt page after receiving the emotive image sharing request from the another contact;

reading message text of the another contact from the emotive image sharing request; and displaying the message text and corresponding shared prompt information on the prompt page.

17. An information processing apparatus, comprising:

processing circuitry configured to:

display a plurality of candidate contact identifiers in response to an emotive image application operation triggered by a user;

receive a user selection of a target contact identifier from the plurality of candidate contact identifiers;

display at least one emotive image corresponding to the target contact identifier, the at least one emotive image being shared by a target contact of the target contact identifier;

receive a user selection of the shared emotive image from the at least one emotive image corresponding to the target contact identifier;

send an emotive image acquisition request to the target contact corresponding to the target contact identifier, the emotive image acquisition request identifying the shared emotive image for which authorization is requested; and add the shared emotive image to an emotive image library based on the authorization to use the shared emotive image being received.

18. The information processing apparatus according to claim 17, wherein the processing circuitry is configured to:

display, in response to an emotive image management operation triggered by the user, a favorite emotive image of the user; and set, in response to an emotive image sharing operation being performed on the favorite emotive image, the favorite emotive image as a shareable emotive image of the user.

19. The information processing apparatus according to claim 17, wherein the processing circuitry is configured to:

display an emotive image application subpage in response to the emotive image application operation; and display the plurality of candidate contact identifiers on the emotive image application subpage.

20. A non-transitory computer-readable storage medium storing instructions which when executed by at least one processor cause the at least one processor to perform:

displaying a plurality of candidate contact identifiers in response to an emotive image application operation triggered by a user;

receiving a user selection of a target contact identifier from the plurality of candidate contact identifiers;

displaying at least one emotive image corresponding to the target contact identifier, the at least one emotive image being shared by a target contact of the target contact identifier;

receiving a user selection of the shared emotive image from the at least one emotive image corresponding to the target contact identifier;

sending an emotive image acquisition request to the target contact corresponding to the target contact identifier, the emotive image acquisition request identifying the shared emotive image for which authorization is requested; and adding the shared emotive image to an emotive image library based on the authorization to use the shared emotive image being received.

* * * * *